United States Patent
Tamiya et al.

(10) Patent No.: US 9,661,264 B2
(45) Date of Patent: *May 23, 2017

(54) MULTI-DISPLAY VIDEO COMMUNICATION MEDIUM, APPARATUS, SYSTEM, AND METHOD

(71) Applicant: NINTENDO CO., LTD., Kyoto (JP)

(72) Inventors: Fumihiko Tamiya, Kyoto (JP); Daiji Imai, Kyoto (JP); Bjorn Nash, Vancouver (CA); Darwin Chau, Vancouver (CA); Alex MacFarlane, Vancouver (CA); Steven Evans, Redmond, WA (US); Brandon Gill, San Francisco, CA (US)

(73) Assignee: Nintendo Co., Ltd., Kyoto (JP)

( * ) Notice: Subject to any disclaimer, the term of this patent is extended or adjusted under 35 U.S.C. 154(b) by 169 days.

This patent is subject to a terminal disclaimer.

(21) Appl. No.: 13/827,596

(22) Filed: Mar. 14, 2013

(65) Prior Publication Data

US 2013/0321648 A1     Dec. 5, 2013

(30) Foreign Application Priority Data

Jun. 1, 2012   (JP) ................................ 2012-126493
Nov. 16, 2012  (JP) ................................ 2012-252376
Nov. 16, 2012  (JP) ................................ 2012-252377

(51) Int. Cl.
*H04N 7/14*     (2006.01)
*H04N 5/222*    (2006.01)
(Continued)

(52) U.S. Cl.
CPC ......... *H04N 7/141* (2013.01); *H04L 12/1813* (2013.01); *H04N 5/23222* (2013.01);
(Continued)

(58) Field of Classification Search
CPC .......... H04N 7/15; H04N 7/152; H04N 7/141; H04N 7/147; G09G 5/14; H04L 12/1818
(Continued)

(56) References Cited

U.S. PATENT DOCUMENTS 5,999,207 A * 12/1999 Rodriguez et al. ........ 348/14.03
6,025,871 A *  2/2000 Kantor .................. G06F 3/1423
                                              348/14.03
(Continued)

FOREIGN PATENT DOCUMENTS

JP    07-298227 A    11/1995
JP    09-319890 A    12/1997
(Continued)

OTHER PUBLICATIONS

Office Action issued in Application U.S. Appl. No. 13/826,789 dated Aug. 18, 2014.

(Continued)

*Primary Examiner* — Chia-Wei A Chen
(74) *Attorney, Agent, or Firm* — Nixon & Vanderhye P.C.

(57) ABSTRACT

In an example system, an information processing apparatus is caused to function as a user image acquisition unit which acquires a user image captured by using a camera of a portable information processing apparatus, a communication partner image acquisition unit which acquires a communication partner image via a network, and a display control unit which causes the user image to be displayed on at least one of a display of the portable information processing apparatus and an external display, and which causes the communication partner image to be displayed on at least one of the display of the portable information processing apparatus and the external display.

18 Claims, 17 Drawing Sheets

(51) Int. Cl.
*H04N 5/232* (2006.01)
*H04L 12/18* (2006.01)
*H04N 5/272* (2006.01)
*H04N 7/15* (2006.01)

(52) U.S. Cl.
CPC ............ *H04N 5/272* (2013.01); *H04N 7/147* (2013.01); *H04N 7/157* (2013.01)

(58) Field of Classification Search
USPC .................. 348/14.01–14.16, 211.1–211.99, 348/333.01–333.13
See application file for complete search history.

(56) References Cited

U.S. PATENT DOCUMENTS

| | | | | |
|---|---|---|---|---|
| 6,727,935 | B1* | 4/2004 | Allen et al. ................ | 348/14.03 |
| 7,634,540 | B2* | 12/2009 | Ivashin et al. ................ | 709/204 |
| 7,679,648 | B2* | 3/2010 | Johansen ............. | H04N 19/124 |
| | | | | 348/14.12 |
| 7,821,504 | B2* | 10/2010 | Janik .................... | H04N 5/4403 |
| | | | | 178/18.01 |
| 8,144,633 | B2* | 3/2012 | Yoakum et al. ............. | 370/261 |
| 8,284,233 | B2 | 10/2012 | Bennett et al. | |
| 8,502,856 | B2* | 8/2013 | Cranfill et al. ............ | 348/14.02 |
| 8,514,263 | B2 | 8/2013 | Periyannan et al. | |
| 8,648,894 | B2 | 2/2014 | Laney et al. | |
| 8,675,067 | B2 | 3/2014 | Chou et al. | |
| 8,842,082 | B2* | 9/2014 | Migos ................ | G06F 3/04883 |
| | | | | 345/173 |
| 2002/0054216 | A1* | 5/2002 | Kawashima .................. | 348/211 |
| 2002/0105598 | A1* | 8/2002 | Tai et al. ...................... | 348/705 |
| 2006/0083194 | A1 | 4/2006 | Dhrimaj et al. | |
| 2006/0085753 | A1 | 4/2006 | Vance et al. | |
| 2006/0139466 | A1* | 6/2006 | Johansen ............. | H04N 19/124 |
| | | | | 348/240.99 |
| 2007/0035616 | A1* | 2/2007 | Lee .................... | H04N 1/00307 |
| | | | | 348/14.16 |
| 2008/0225109 | A1* | 9/2008 | Lee .......................... | H04N 7/15 |
| | | | | 348/14.02 |
| 2008/0246834 | A1* | 10/2008 | Lunde .................... | H04N 7/142 |
| | | | | 348/14.09 |
| 2009/0251472 | A1 | 10/2009 | Antoine | |
| 2010/0097310 | A1* | 4/2010 | Lee .................... | H04N 1/00307 |
| | | | | 345/156 |
| 2010/0103243 | A1 | 4/2010 | Won et al. | |
| 2010/0118935 | A1 | 5/2010 | Kakii et al. | |
| 2010/0259684 | A1 | 10/2010 | Kambe | |
| 2010/0271287 | A1* | 10/2010 | Bourne ................ | A47B 81/065 |
| | | | | 345/1.3 |
| 2011/0208807 | A1 | 8/2011 | Shaffer | |
| 2011/0292161 | A1* | 12/2011 | Sharon .................. | H04N 7/142 |
| | | | | 348/14.07 |
| 2012/0038742 | A1* | 2/2012 | Robinson ............... | H04N 7/142 |
| | | | | 348/14.16 |
| 2012/0092438 | A1* | 4/2012 | Guzman Suarez et al. .......................... | 348/14.03 |
| 2013/0265378 | A1* | 10/2013 | Abuan et al. ............. | 348/14.02 |
| 2013/0307920 | A1* | 11/2013 | Cahill et al. ............... | 348/14.03 |
| 2013/0321563 | A1 | 12/2013 | Tamiya et al. | |
| 2014/0036022 | A1* | 2/2014 | Croen et al. ............. | 348/14.01 |
| 2014/0063174 | A1* | 3/2014 | Junuzovic et al. ........ | 348/14.02 |
| 2014/0118468 | A1* | 5/2014 | Purdy et al. ............. | 348/14.08 |
| 2014/0253665 | A1* | 9/2014 | Nietfeld et al. ............ | 348/14.04 |
| 2014/0354759 | A1* | 12/2014 | Cranfill et al. .............. | 348/14.1 |

FOREIGN PATENT DOCUMENTS

| | | |
|---|---|---|
| JP | 2005-151446 A | 6/2005 |
| JP | 08-517525 A | 5/2008 |
| JP | 2012-085172 | 4/2012 |
| WO | 2006/043977 A1 | 4/2006 |

OTHER PUBLICATIONS

Office Action issued on Jan. 16, 2015 in U.S. Appl. No. 13/826,789.
Notice of Reason for Rejection in JP Application No. 2012-252377 mailed Feb. 28, 2017 (with English translation).
Online Software Topics: Reporting a Choice Selection of New and Noteworthy Online Software. Windows 100%, Japan, Shinyusha Co., Ltd., vol. 11, No. 10, 120th Issue, p. 17, Oct. 1, 2008.

* cited by examiner

FIG. 5
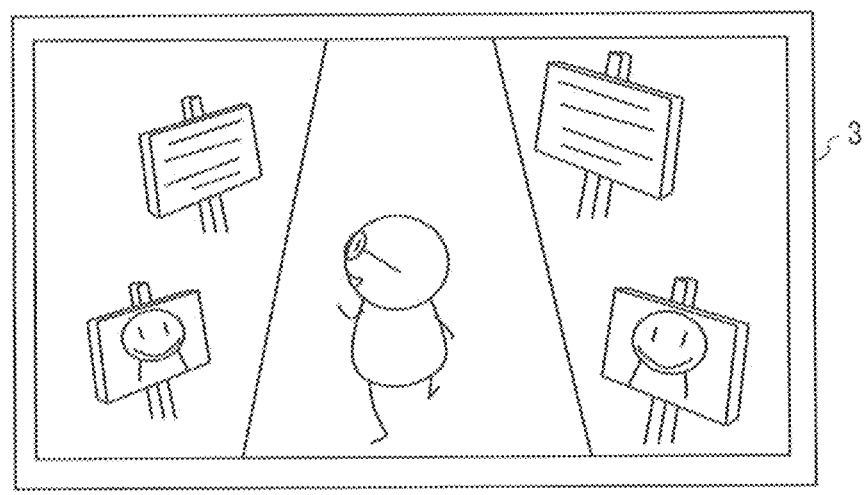
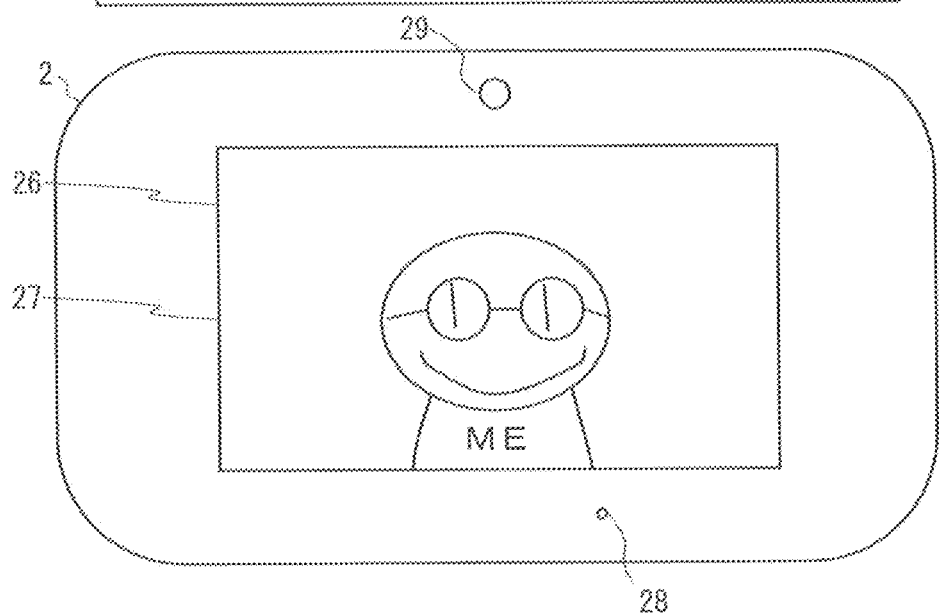

FIG. 8
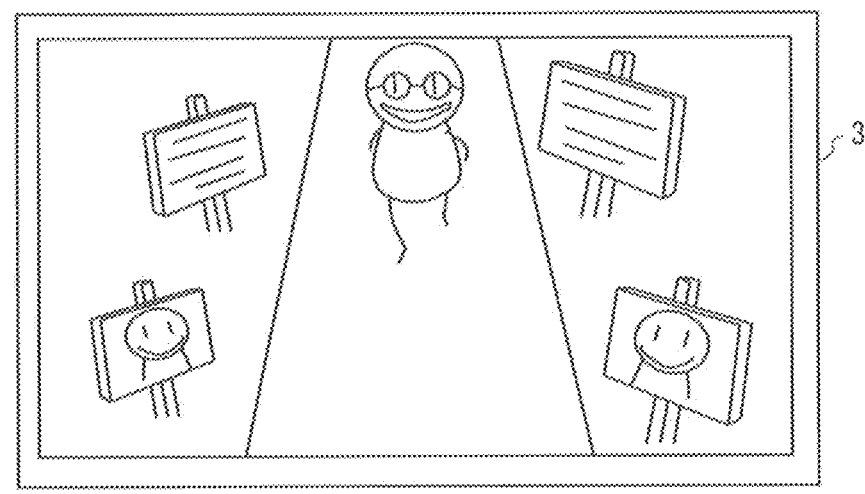
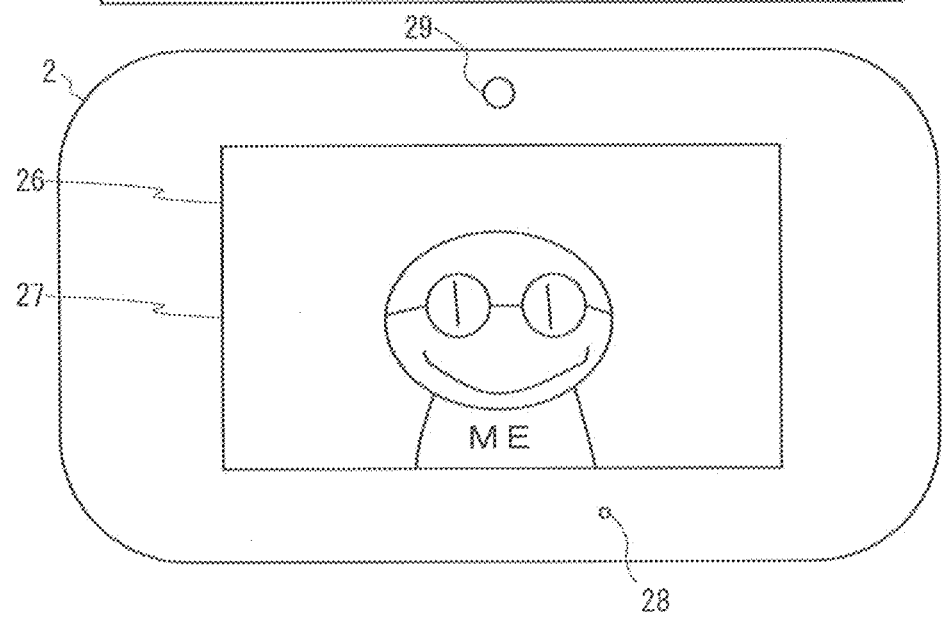

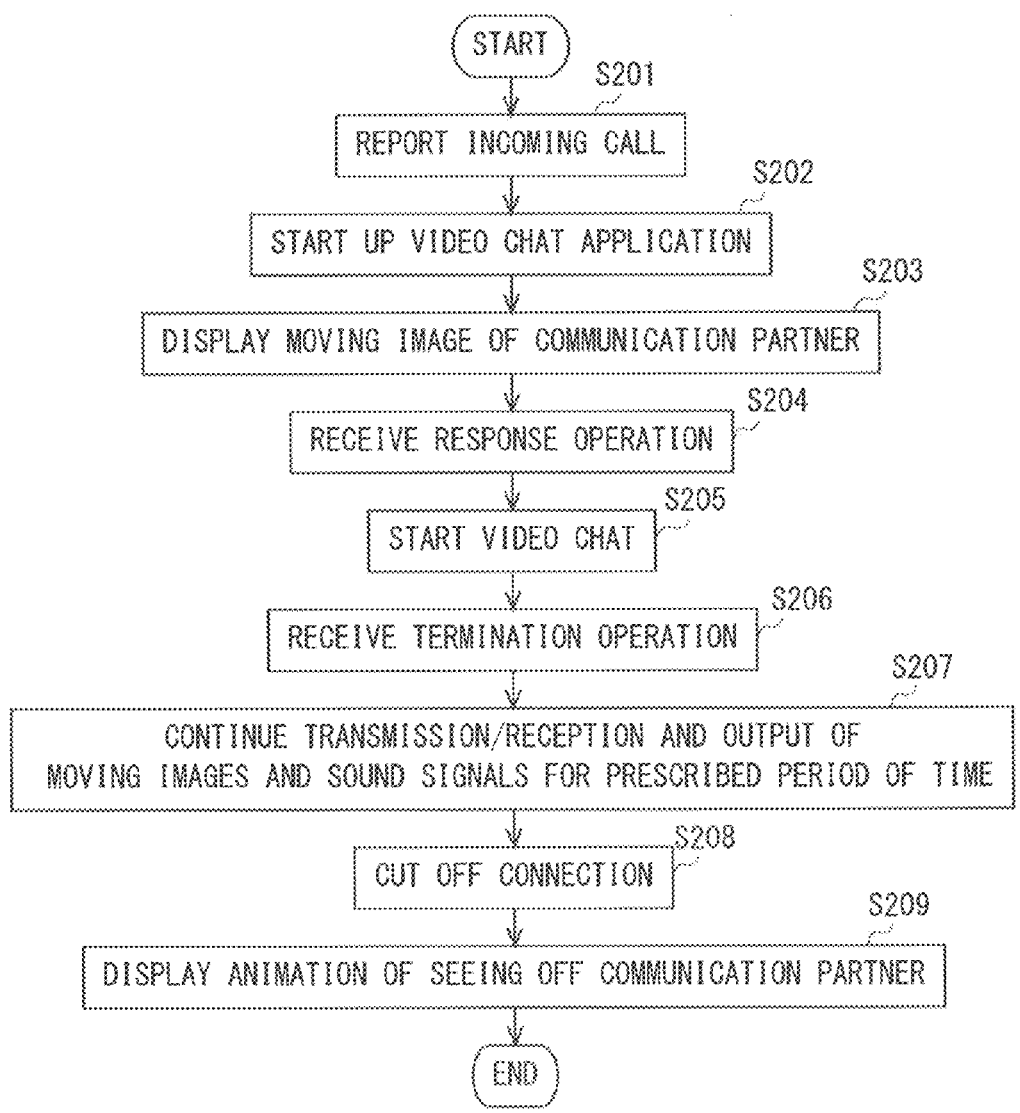

MULTI-DISPLAY VIDEO COMMUNICATION MEDIUM, APPARATUS, SYSTEM, AND METHOD

This application is based upon and claims the benefit of priority of the prior Japanese Patent Applications No. JP2012-126493 filed on Jun. 1, 2012, JP2012-252376 filed on Nov. 16, 2012, and JP2012-252377 filed on Nov. 16, 2012, the entire contents of which are incorporated herein by reference.

FIELD

The present disclosure relates to an information processing apparatus which is connected to a display apparatus.

BACKGROUND AND SUMMARY

The present disclosure employs the following composition. More specifically, the computer-readable non-transitory medium relating to the present disclosure is a computer-readable non-transitory medium on which is recorded an information processing program for causing a computer connected to a first display apparatus and a second display apparatus to function as: a first image acquisition unit which acquires a first image captured by using a camera capable of capturing an image of a user who is viewing the first display apparatus; a second image acquisition unit which acquires, from another information processing apparatus which is connected via a network, a second image captured by using another camera capable of capturing an image of a user of the other information processing apparatus; and a display control unit which causes the first image to be displayed on at least one of the first display apparatus and the second display apparatus, and which causes the second image to be displayed on at least one of the first display apparatus and the second display apparatus.

Furthermore, the information processing program may further cause the computer to function as a switching unit which switches a display state of the first image or the second image, between the first display apparatus and the second display apparatus.

Moreover, the display control unit may cause the first image to be displayed on the first display apparatus and cause the second image to be displayed on the second display apparatus.

Furthermore, the display control unit may further cause the first image to be displayed on the second display apparatus.

Moreover, the display control unit may cause the first image and the second image to be displayed on the first display apparatus and cause an image that is neither the first image nor the second image to be displayed on the second display apparatus.

Moreover, the display state which is switched by the switching unit may include: a first display state in which the first image is displayed on the first display apparatus and the second image is displayed on the second display apparatus, and a second display state in which the first image and the second image are displayed on the first display apparatus and an image that is neither the first image nor the second image is displayed on the second display apparatus.

Furthermore, the first display apparatus and the second display apparatus may each have a first display region and a second display region; and the display control unit may cause one of the first image and the second image to be displayed on the first display region of the first display apparatus and the first display region of the second display apparatus, and cause the other of the first image and the second image to be displayed on the second display region of the first display apparatus and the second display region of the second display apparatus.

Furthermore, the information processing program may further cause the computer to function as a switching unit which switches the first image and the second image between the first display region and the second display region.

Moreover, the information processing program may further cause the computer to function as an operation receiving unit which is provided in the first display apparatus and which receives an operation performed by the user; and the switching unit switches the first image and the second image respectively in the first display apparatus and the second display apparatus, when an operation indicating the second display region of the first display apparatus is received by the operation receiving unit.

Moreover, the display control unit may control display in such a manner that the first display region is larger than the second display region in the same display apparatus.

Furthermore, the first display apparatus may be a display apparatus which is used exclusively by the user, and the second display apparatus may be a display apparatus that can also be viewed by viewers other than the user.

Moreover, the computer may be connected to a portable information processing apparatus and the first display apparatus and the camera may be provided on the portable information processing apparatus.

Furthermore, the present disclosure can also be understood as an information processing apparatus, an information processing system having one or a plurality of information processing apparatuses, a method which is executed by a computer, or a program which is executed in a computer.

Furthermore, the present disclosure may be a program of this kind which is recorded on a recording medium that can be read by a computer or other apparatus or machine.

Here, the recording medium which can be read by the computer, or the like, is a recording medium on which information such as data or a program can be stored by an electrical, magnetic, optical, mechanical or chemical action, and from which information can be read by a computer, or the like.

BRIEF DESCRIPTION OF THE DRAWINGS

FIG. 5 shows a non-limiting example of a pre-connection presentation screen of a video chat application;

FIG. 8 shows a non-limiting example of a post-termination presentation screen of a video chat application;

FIG. 9 shows a non-limiting example of a flowchart showing a flow of recipient-side video chat processing;

DETAILED DESCRIPTION OF NON-LIMITING EXAMPLE EMBODIMENTS

Below, embodiments of the present disclosure are described with reference to the drawings.

The embodiments described below show examples of the implementation of the present disclosure, and the disclosure is not limited to the concrete composition described below. In implementing the present disclosure, it is possible to adopt the concrete compositions of the respective embodiments as appropriate.

For instance, the present disclosure can also be applied to an information processing program which is executed by a general computer, an information processing apparatus, an information processing system having one or a plurality of information processing apparatuses, an information processing method, and the like.

<Overview of System Relating to the Embodiments>

Figure 1:
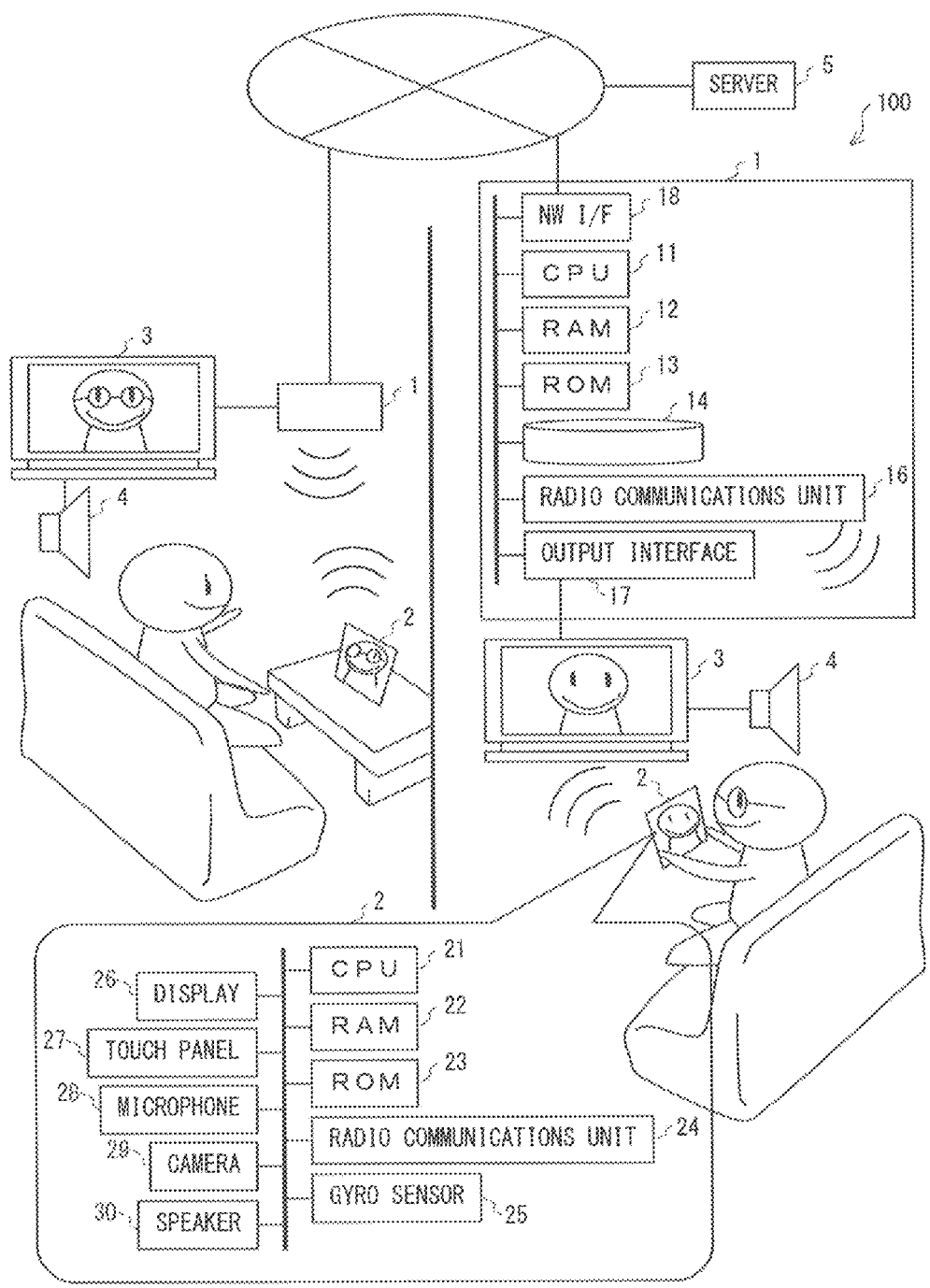
FIG. 1 shows a non-limiting example of a schematic view of a hardware composition of an information processing system.

FIG. 1 is a diagram showing a schematic view of a hardware composition of an information processing system 100 relating to the present embodiment. The information processing system 100 relating to the present embodiment includes a stationary first information processing apparatus 1 which is connected to an external display 3, such as a television receiver, and a portable (hand-held or mobile) second information processing apparatus 2 including a built-in display 26, a camera 29 and a microphone 28. The second information processing apparatus 2 is portable, and therefore, the user is able to carry the apparatus freely, and the internal display 26 of the second information processing apparatus 2 can be used exclusively by the user during use. The second information processing apparatus 2 may be a controller of the first information processing apparatus 1. Furthermore, the second information processing apparatus 2 may be an operating apparatus equipped with a display.

Moreover, the information processing system 100 is connected to one or a plurality of other information processing systems 100 via a network, such as the Internet. The plurality of information processing systems 100 which are connected via the network provide a video chat function to the user by transmitting and receiving, between the systems via the network, moving images and voice signals input using the cameras 29 and the microphones 28 in the respective information processing systems 100.

In the present embodiment, the moving image and the voice signal input to the second information processing apparatus 2 are transmitted to the first information processing apparatus 1 via radio communications units 24 and 16, and the first information processing apparatus 1 transmits the moving image and voice signal to the other information processing systems 100 via the network. The moving images and voice signals received from the other information processing systems 100 are transferred from the first information processing apparatus 1 to the second information processing apparatus 2, and the second information processing apparatus 2 decodes the received moving images and voice signals and outputs these to the built-in display 26 and a built-in speaker 30. The means for communicating with other information processing systems 100 via a network may be provided in the second information processing apparatus 2. The first information processing apparatus 1 outputs the received moving images and voice signals to the external display 3 and the external speaker 4.

The first information processing apparatus 1 is an information processing apparatus including a central processing unit (CPU) 11, a random access memory (RAM) 12, a read only memory (ROM) 13, an auxiliary storage apparatus 14, a radio communications unit 16 for carrying out radio communications with the second information processing apparatus 2, an output interface 17 which is connected to the external display 3 and the external speaker 4, and a network interface 18 for communicating with other information processing systems 100 via the network.

The CPU 11 is a central processing apparatus, which controls the respective constituent parts provided in the first information processing apparatus 1, such as the RAM 12, auxiliary storage apparatus 14, and the like, by processing commands and data developed in the RAM 12 and the ROM 13, and the like. Furthermore, the RAM 12 is a main memory, which is controlled by the CPU 11, and commands and data of various types are written to and read out from the RAM 12. In other words, the CPU 11, the RAM 12 and the ROM 13 constitute a control unit of the first information processing apparatus 1.

The auxiliary storage apparatus 14 is a non-volatile storage apparatus, to and from which data is written and read, mainly, information which is to be saved even when the power supply to the first information processing apparatus 1 is switched off, for example, the operating system (OS) of the first information processing apparatus 1 which is loaded to the RAM 12, and various programs for executing the processing described below, as well as data of various kinds which is used by the first information processing apparatus 1. For the auxiliary storage apparatus 14, it is possible to use an electrically erasable programmable ROM (EEPROM), or a hard disk drive (HDD), or the like. Furthermore, it is also possible to use a portable medium which is installed detachably in the first information processing apparatus 1, as the auxiliary storage apparatus 14. Examples of the portable medium include a memory card based on an EEPROM, or the like, or a compact disc (CD), a digital versatile disc (DVD), and a Blu-ray Disc (BD), and so on. The auxiliary storage apparatus 14 based on a portable medium can be used in combination with an auxiliary storage apparatus 14 which is not portable.

The radio communications unit 16 is a device for sending and receiving electromagnetic waves in a prescribed waveband and for performing radio communications with the second information processing apparatus 2.

The second information processing apparatus 2 is an information processing apparatus in which the following elements are electrically connected: a CPU 21, a RAM 22, a ROM 23, a radio communications unit 24 for carrying out radio communications with the first information processing apparatus 1, a gyro sensor 25, a built-in display 26, a touch panel 27 provided on the built-in display 26, a microphone 28, a camera 29 and a built-in speaker 30. In the respective embodiments, constituent elements can be omitted, substituted and added appropriately, in respect of the concrete hardware composition of the first information processing apparatus 1 and the second information processing apparatus 2.

The CPU 21, the RAM 22, the ROM 23 and the radio communications unit 24 provided in the second information processing apparatus 2 are substantially the same as the CPU 11, the RAM 12, the ROM 13 and the radio communications unit 16 provided in the first information processing apparatus 1, and therefore description thereof is omitted here.

The second information processing apparatus 2 decodes moving images and voice signals transmitted by the radio communications unit 16 of the first information processing apparatus 1 and received by the radio communications unit 24, and outputs to the built-in display 26 and the built-in speaker 30. The decoding of the moving images and the voice signals can be carried out by a CPU 21, or a processor for decoding (not illustrated) may be provided separately from the CPU 21 and the decoding may be carried out by this processor.

Furthermore, the information acquired via the input apparatuses, such as the gyro sensor 25, the touch panel 27, the microphone 28, the camera 29, and the like, which are provided in the second information processing apparatus 2, are transmitted to the first information processing apparatus 1 via the radio communications units 24 and 16.

The camera 29 is provided at a position where it can capture images of a user in a state where the user is using the second information processing apparatus 2, in other words, a position where the imaging direction is facing towards the user. Here, a state where the user is using the second information processing apparatus 2 is a state where the second information processing apparatus 2 is standing on a desk, or the like, in order to be used by the user, or is being held in order to be used by the user, and so on. By providing a camera 29 at a position of this kind, the information processing system 100 can capture images of the user while the user is using a video chat application, which is described below.

Furthermore, the information processing system 100 can communicate with a server via a network. The server manages connection destination information of the information processing system 100, in association with user information of the information processing system 100. The server reports connection destination information held in association with user information of a communication partner, in accordance with a request from the information processing system 100.

Figure 2:
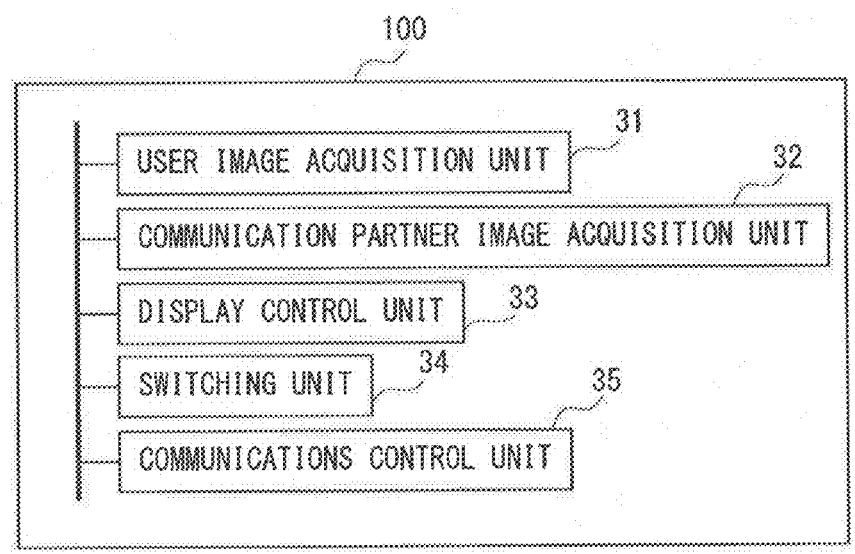
FIG. 2 shows a non-limiting example of a schematic view of a hardware composition of an information processing system.

FIG. 2 is a diagram showing a schematic view of the functional composition of an information processing system 100 relating to the present embodiment. The information processing system 100 relating to the present embodiment functions as an information processing system 100 including a user image acquisition unit 31, a communication partner image acquisition unit 32, a display control unit 33, a switching unit 34 and a communications control unit 35, by means of the CPUs 11 and 21 respectively interpreting and executing the programs of various kinds developed in the RAMs 12 and 22.

The user image acquisition unit 31 acquires a user image captured by using the camera 29. Furthermore, the communication partner image acquisition unit 32 acquires, from another information processing system 100 which is connected via the network, a communication partner image which is an image of the user of the other information processing system 100.

The display control unit 33 displays a user image on at least one of the built-in display 26 and the external display 3, and displays a communication partner image on at least one of the built-in display 26 and the external display 3. Variations of the assignment of images displayed on the external display 3 and the built-in display 26 during a video chat are described below with reference to FIG. 10A to FIG. 10D.

The switching unit 34 switches the display state of the user image or the communication partner image, between the built-in display 26 and the external display 3. The information processing system 100 relating to the present embodiment can assign the images used in a video chat to the two displays in a variety of patterns, and the displays on which the images used in video chat are displayed can be changed freely during a video chat. For example, the display state which is switched by the switching unit 34 includes the display states which are described below with reference to FIG. 10A to FIG. 10D.

The communications control unit 35 controls communications that are performed via the network with the server or the information processing system 100 of a communication partner.

<Flow of Processing>

Next, the flow of processing executed in the present embodiment will be described. The concrete details of the processing and the processing sequence shown in the flowchart relating to the present embodiment are examples for implementing the present disclosure. The concrete processing contents and the processing sequence may be selected appropriately in each embodiment of the present disclosure.

Figure 3A:
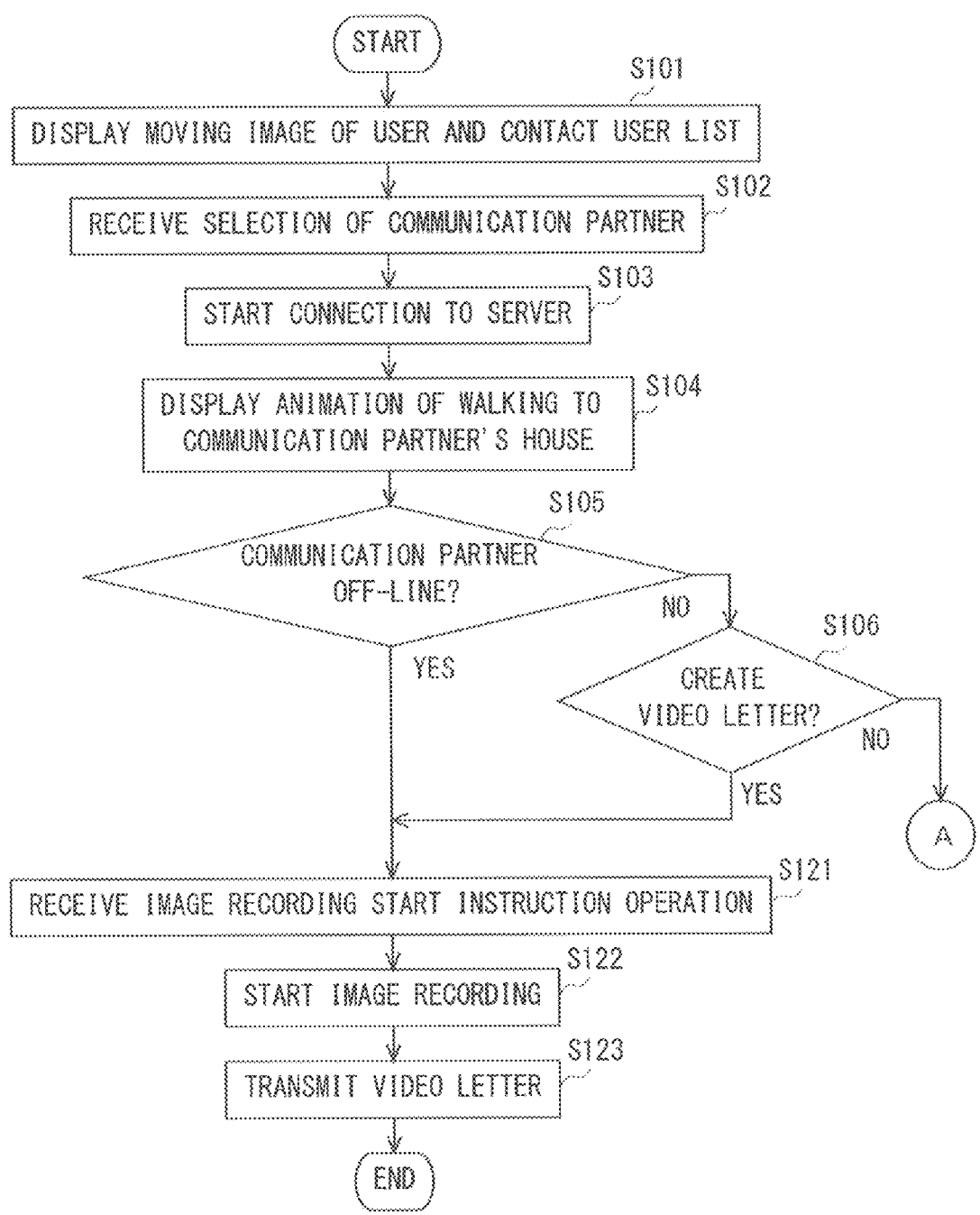
FIG. 3A shows a non-limiting example of a flowchart A showing a flow of caller-side video chat processing.
Figure 3B:
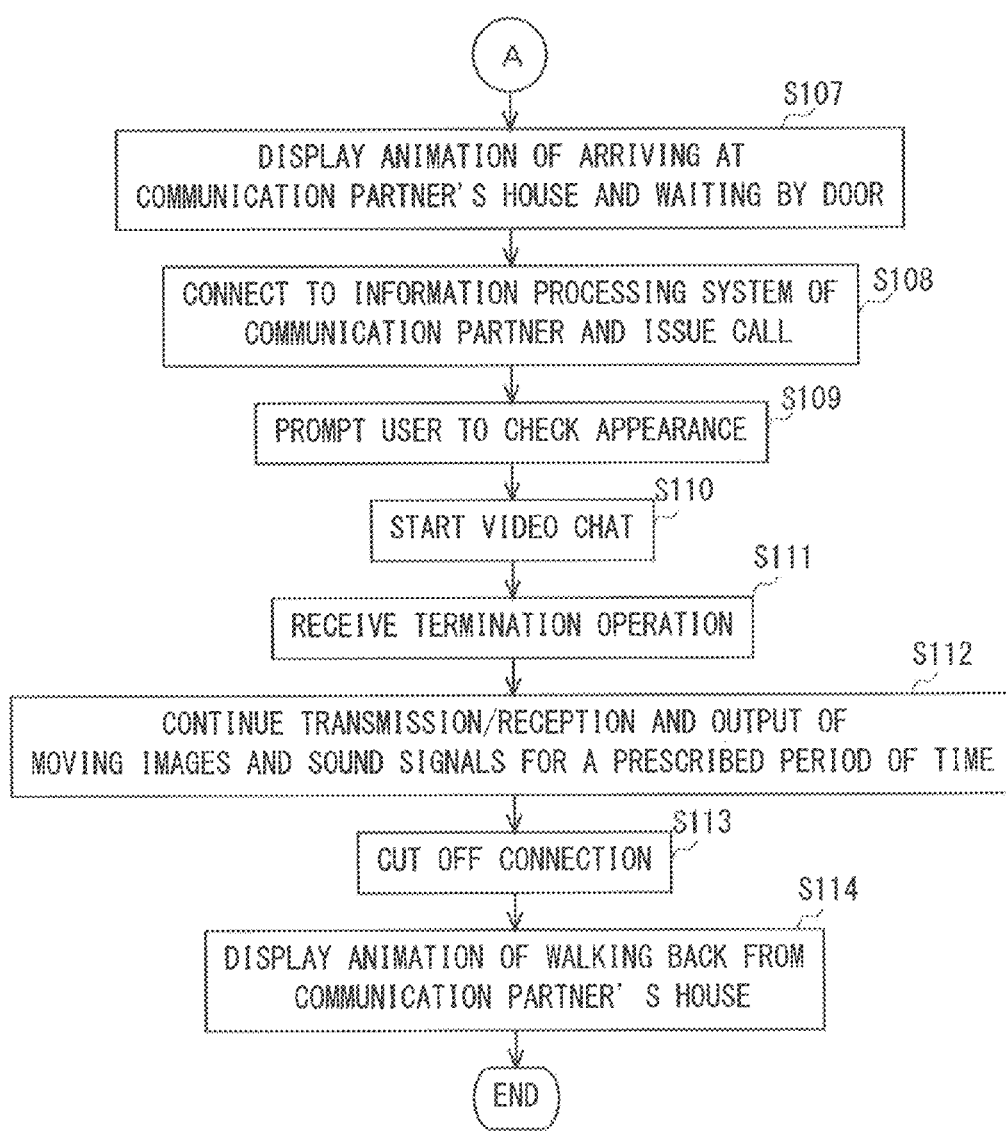
FIG. 3B shows a non-limiting example of a flowchart B showing a flow of caller-side video chat processing.

FIG. 3A and FIG. 3B are flowcharts showing a flow of caller-side video chat processing relating to the present embodiment. The caller-side video chat processing shown in this flowchart is executed when a video chat application installed in the information processing system 100 is started up, on the basis of an instruction from the user.

In step S101 and step S102, a moving image of the user and a contact user list are displayed, and selection of a communication partner for a video chat is accepted. When the video chat application is started up, the user image acquisition unit 31 acquires a current moving image captured by the camera 29, in other words, a current moving image of the user, and the display control unit 33 displays the acquired moving image of the user on the built-in display 26 of the second information processing apparatus 2. Furthermore, the display control unit 33 also displays a contact user list on the external display 3 and the built-in display 26 (step S101).

Figure 4:
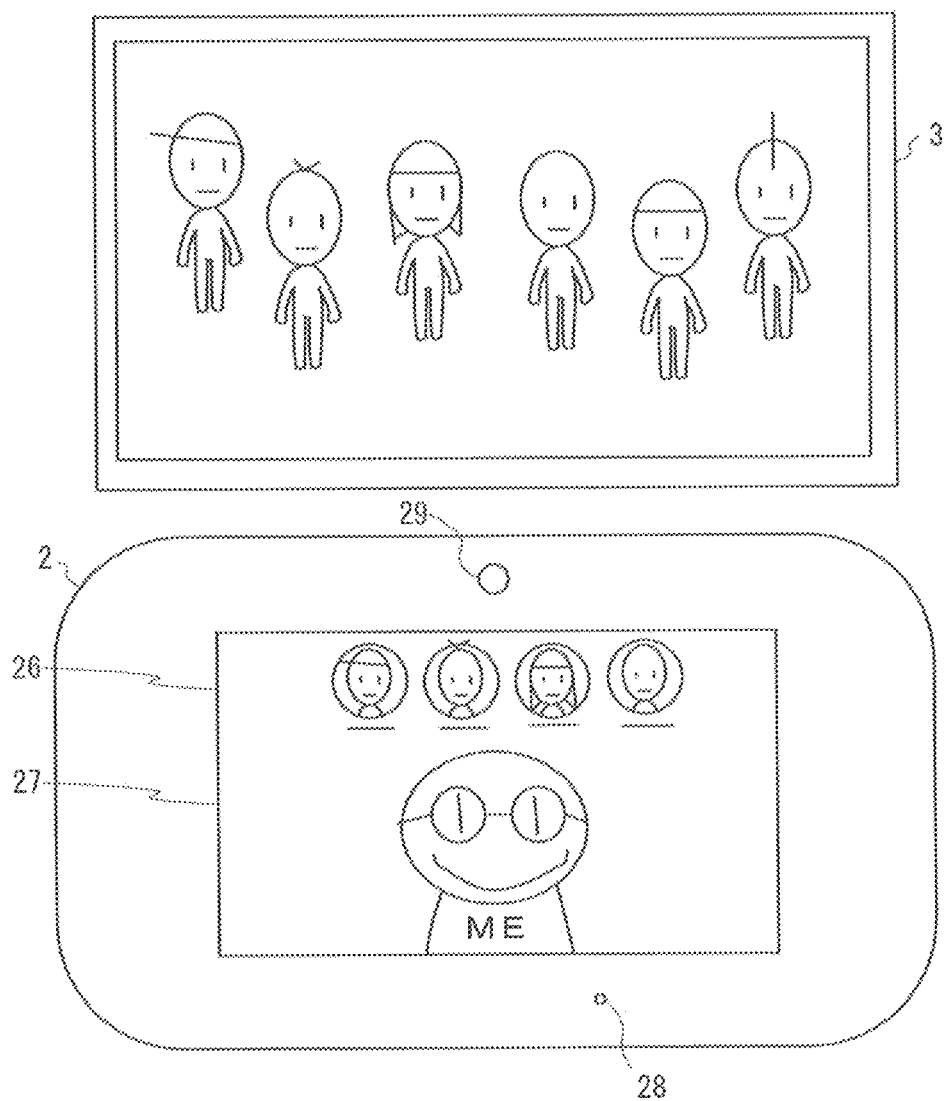
FIG. 4 shows a non-limiting example of a destination user selection screen of a video chat application.

FIG. 4 is a diagram showing a contact user selection screen image of the video chat application according to the present embodiment. Avatars of users registered in the contact user list are displayed on the external display 3, and icons and names of the users registered in the contact user list are displayed so as to be superimposed on the moving image of the user, on the built-in display 26. The external display 3 may also display the relationship between the user and the users registered in the contact user list, and/or recordings of past video chats (captured images, or an image edited in a "drawing chat" which is described below, or the like). Furthermore, the moving image of the user which is displayed on the built-in display 26 may be displayed simultaneously with the start-up of the application, or may be displayed after waiting for a display operation performed by the user after the start-up of the application.

The contact user list displayed on the external display 3 and the built-in display 26 may be arranged according to a prescribed order of priority. For example, the contact user list may display contact users on the external display 3 and the built-in display 26 in the order of contact users having highest use frequency, for instance, in order of the longest total time for which video chats have been performed thus far, or in order of the most times that video chats have been performed thus far. In the example shown in FIG. 4, user avatars or icons are arranged from left to right in order of highest priority. The arrangement of the icons is not limited to an arrangement from left to right. The icons may also be arranged in the vertical direction, or may be arranged over a plurality of columns or a plurality of rows. Furthermore, the display order of the contact users does not have to be a sequence based on the use frequency of video chat. For example, the contact users may be arranged in sequence based on the last date that a video chat was performed, starting from the most recent date, or may be arranged in alphabetical order based on the user name.

Moreover, the user image displayed on the built-in display 26 may be an inverted view of the captured image captured by the camera 29. By adopting a composition of this kind, a user is able to treat the display shown on the built-in display 26 as a mirror depicting his or her own image, and can use the display on the built-in display 26 for purposes such as tidying up his or her appearance before the start of a video chat.

Furthermore, the external display 3 or the built-in display 26 may also show a display indicating whether the respective contact users are on-line (a state in which it is possible to connect to the information processing system 100 of a communication partner) or off-line (a state in which it is not possible to connect to the information processing system 100 of a communication partner), on the basis of the user information on the contact user list acquired previously from a server.

When a contact user list is displayed on the built-in display 26, the user is able to select a contact user by performing an operation for selecting an icon of a desired contact user via a touch panel 27 which is provided on the built-in display 26. The information processing system 100 receives a contact user selection operation performed by the user (step S102). In the present embodiment, when performing a video chat, the operations that must be performed by the user are an operation of starting up the video chat application and an operation of selecting a contact user, and therefore the user is able to perform a video chat by a two-step operation. Furthermore, when the operation of starting up the video chat application and the operation of selecting the contact user are each operations which involve touching a touch panel 27 once, then the user is able to perform a video chat just by touching the touch panel 27 twice. However, in order to prevent erroneous calling, it is possible to make the "call button" for confirmation become effective after selecting a contact user, and to wait for this button to be pressed before starting connection. Thereafter, the processing advances to step S103.

In step S103, connection to the server is started. The communications control unit 35 connects to the server and acquires connection destination information (for example, the IP address) of the information processing system 100 of the contact user (hereinafter, called the "communication partner"). The server saves the user information and the connection destination information of the information processing system 100 relating to the user information, and returns the connection destination information of the communication partner in accordance with a request for connection destination information made by the information processing system 100. When connection to the server is started, the processing advances to step S104.

In step S104, an animation of the avatar of the user walking to the house of the communication partner is displayed. The display control unit 33 generates an animation of the avatar of the user walking along a road towards the house of the communication partner, and displays this animation on the external display 3. This animation is displayed for a prescribed period of time (for example, 10 seconds).

FIG. 5 is a diagram showing a pre-connection presentation screen image of the video chat application according to the present embodiment. Information relating to the communication partner is displayed on either side of the road in the animation which is displayed here. The display control unit 33 causes a portion of the image captured in a previous video chat with the communication partner, and text obtained by voice recognition of a portion of the conversation exchanged in the previous video chat, and the like, to be displayed on the external display 3 so as to be arranged along both sides of the road. However, in the pre-connection presentation screen image, it is also possible to make a presentation that does not depict a "road". In cases such as this also, the display control unit 33 may cause a portion of the image captured in a previous video chat with the communication partner, and text obtained by voice recognition of a portion of the conversation exchanged in the previous video chat, and the like, to be displayed on the external display 3. By adopting a composition of this kind, the video chat application relating to the present embodiment can cause the user to recall a memory in relation to the partner with whom he or she is to perform a video chat, and can also give the user topics for conversation in the video chat that is about to start. Incidentally, a portion of the conversation exchanged in the previous video chat may also be output as a voice directly from the external speaker 4 or the built-in speaker 30 of the second information processing apparatus 2. During this, the current moving image of the user captured by the camera 29 is displayed on the built-in display 26 of the second information processing apparatus 2. Furthermore, a selection option for creating a video letter may also be displayed on the built-in display 26. This selection option can be chosen via the touch panel 27 during the display of the animation. The flow of processing carried out when creation of a video letter has been selected is described below. Thereafter, the processing advances to step S105.

In step S105 and step S106, the circumstances of the communication partner and the selection circumstances for creating a video letter are judged. The information processing system 100 judges whether the communication partner is on-line (a state in which it is possible to connect to the information processing system 100 of the communication partner), or off-line (a state in which it is not possible to connect to the information processing system 100 of the communication partner), by judging whether or not connection destination information for the communication partner has been obtained from the server connected in step S103 (step S105). Furthermore, the information processing system 100 judges whether or not a user operation for selecting creation of a video letter has been accepted (step S106). Here, if it is judged that the communication partner is off-line, or if it is judged that creation of a video letter has been selected, then the processing advances to step S121. On the other hand, if the communication partner is on-line and if it is judged that creation of a video letter has not been selected, then the processing advances to step S107. When it has been judged that the communication partner is off-line (YES at step S105), it is possible to enable the user to choose whether or not the creation of a video letter is required, rather than advancing automatically to creation of a video letter (step S121). Here, if the creation of a video letter is selected by the user, then the processing advances to the creation of a video letter in step S121 onwards. On the other hand, if the creation of a video letter is not selected by the user, then the processing shown in this flowchart is terminated.

In step S107, the avatar of the user arrives at the house of the communication partner and an animation showing the avatar of the user waiting for an avatar of the communication partner at the door of the house is displayed. The display control unit 33 generates an animation of the avatar of the user arriving at the house of the communication partner and knocking on the door of the house of the communication partner (or pressing the door bell), and displays this animation on the external display 3.

Figure 6:
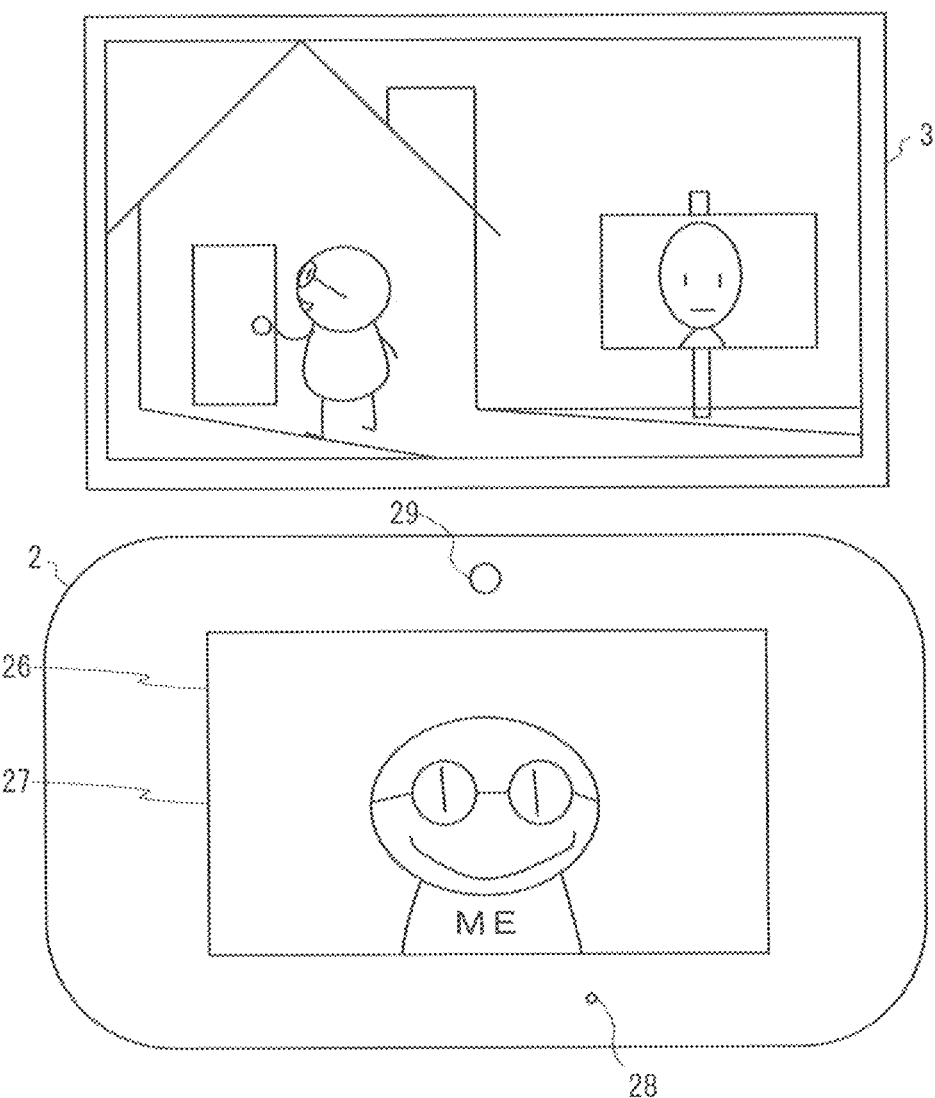
FIG. 6 shows a non-limiting example of a connection presentation screen of a video chat application.

FIG. 6 is a diagram showing a connection presentation screen image of the video chat application according to the present embodiment. By displaying an animation of the avatar of the user walking up to the house of the communication partner in step S104 (see FIG. 5) and an animation of the avatar of the user arriving at the house of the communication partner and waiting for the avatar of the communication partner to appear from the house in step S107 (see FIG. 6), the video chat application relating to the present embodiment is able to give the user the impression of having a conversation with the communication partner in a shared place, or of going to meet the communication partner. During this, the current moving image of the user captured by the camera 29 is displayed on the built-in display 26 of the second information processing apparatus 2. Incidentally, it is also possible to use a presentation in which a house is not depicted. For example, a possible presentation is one in which a mirror is displayed and a video chat is started when the avatar moves towards the mirror. By providing a presentation of this kind, it is possible to depict a hyperrealistic world in which two users who are in physically separate locations are able to converse exactly as if they were sharing the same space. Thereafter, the processing advances to step S108.

In step S108, connection and calling to the information processing system 100 of the communication partner is carried out. The communications control unit 35 connects to the information processing system 100 of the communication partner on the basis of connection destination information for the communication partner which is obtained by an enquiry made to the server in step S103. Furthermore, a video chat start request to the information processing system 100 of the communication partner is transmitted (a call is made) via this connection, and a response from the information processing system 100 of the communication partner is then awaited. The information processing system 100 of the communication partner reports to the user that a video chat start request (incoming call) has been received, and waits for an operation indicating whether or not to respond to the video chat made by the communication partner. Thereafter, the processing advances to step S109.

The information processing system 100 of the caller-side user may start transmission of moving images acquired by the user image acquisition unit 31, to the information processing system 100 of the recipient side, before the information processing system 100 of the recipient-side user responds to a video chat start request after a call has been made. The processing, performed on the recipient side, of the moving image transmitted to the information processing system 100 of the recipient-side user before the start of the video chat is described below by using the flowchart shown in FIG. 9.

In step S109, the user is prompted to carry out user's appearance check. The information processing system 100 outputs a message prompting the user to check user's appearance by referring to the current moving image of the user which is displayed on the built-in display 26 of the second information processing apparatus 2, after making the call in step S108 and until receiving a response from the information processing system 100 of the communication partner. The message may be output to the external display 3 or the built-in display 26 as text or a moving image, and may be output to the external speaker 4 or the built-in speaker 30 as sound.

The message output here may be, for example, a message which prompts the user to smile. The information processing system 100 outputs a message prompting the user to smile and then detects a smiling face by analyzing an image obtained by the camera 29, using a smiling face detection function of an image analysis engine. When a smiling face is detected, the information processing system 100 implements a display indicating to the user that a smile has been detected. This indication may be made by outputting a message or by changing the content on the display. Thereafter, the processing advances to step S110.

At step S110, a video chat is started. Upon receiving a response indicating that a video chat is accepted from the information processing system 100 of the communication partner, the communication control unit 35 starts a video chat by starting the transmission of the moving image and the sound signal acquired by the user image acquisition unit 31, to the information processing system 100 of the communication partner, and reception of the moving image and the sound signal from the communication partner by the communication partner image acquisition unit 32. The user images and the communication partner images which are transmitted and received are displayed on the external display 4 or the built-in display 26 by the display control unit 33. Furthermore, while a video chat continues, the user's information processing system 100 and the information processing system 100 of the communication partner also transmit and receive other information required for a video chat, via the network, as well as moving images and sound signals. The information which is transmitted and received in this way includes, for example, information indicating that a video chat termination operation has been received, or information for a "drawing chat" as described below, or other information required for capture processing which is described below, and so on.

Moreover, during a video chat, processing such as partial capture of the images in the video chat and partial recording of the conversation exchanged in the video chat, and the like, is also carried out. The partial images and the partial conversation which are captured or recorded in this way are used as information for output in the step S104 when the next video chat is performed, and information for output in step S114 and step S209 after the termination of the current video chat. Thereafter, the processing advances to step S111.

From step S111 to step S113, a video chat termination operation is received and video chat termination processing is carried out. The video chat which has been started in step S110 is continued until a video chat termination operation is carried out by the user or the communication partner. The information processing system 100 receives a video chat termination operation performed by the user or the communication partner (step S111). The information which indicates that a video chat termination operation has been received is transmitted and received between the information processing system 100 of the user and the information processing system 100 of the communication partner, via the network. When a video chat termination operation is received, the display control unit 33 and the communications control unit 35 continue the transmission and reception, and output, of moving images and sound signals of the video chat for a prescribed period of time (for example, 5 seconds) after receiving a termination operation (step S112), and then cuts off the connection with the information processing system 100 of the communication partner (step S113). Here, the prescribed time period is a time that is longer than the time required for normal termination processing, such as session shut-down and display image switching, and the like, after receiving a termination operation. Here, the prescribed time continuation processing in step S112 may be cancelled by a user operation or by user settings. The processing in this step is carried out by transmitting and receiving the moving images and sound signals by both of the information processing systems 100 relating to the video chat processing, and therefore if the prescribed time continuation processing is cancelled by one information processing system 100, the prescribed time continuation processing may be cancelled in the other information processing system 100 as well.

Figure 7:
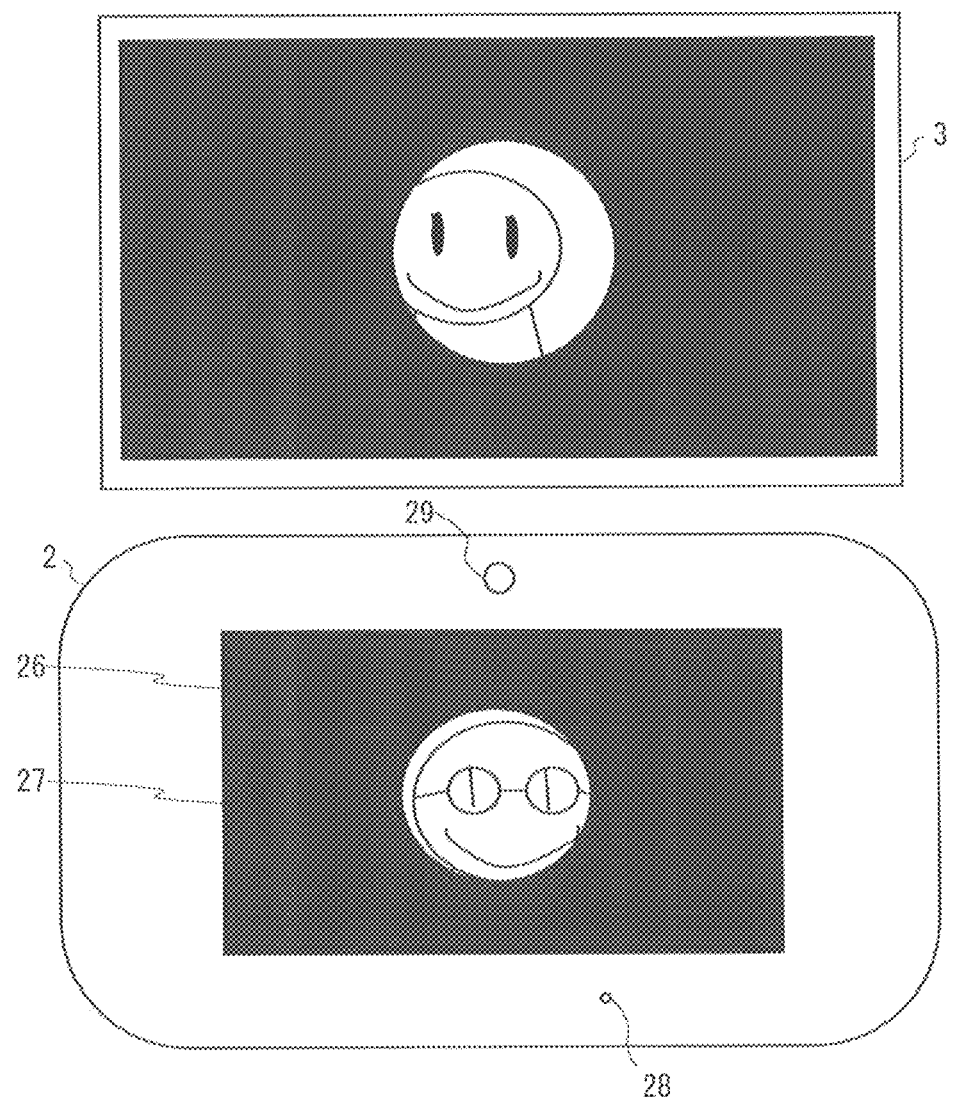
FIG. 7 shows a non-limiting example of a termination presentation screen of a video chat application.

FIG. 7 is a diagram showing a termination presentation screen image of the video chat application according to the present embodiment. FIG. 7 shows an example in which a shutter effect (aperture effect) is applied so as to gradually narrow the display range of the moving image on the video chat screen image, as a termination presentation. However, the effect used in this termination presentation may also be another effect such as a fade-out effect. By continuing the transmission and reception, and output, of moving images and sound signals of the video chat for a prescribed time period after receiving a termination operation, it is possible to avoid sudden interruption of the communication at the termination of a video chat, the user and the communication partner can be given time to say goodbye to each other, and the user and the communication partner can terminate the video chat while waving and exchanging words. In other words, according to the termination presentation relating to the present embodiment, it is possible to present a method of parting which makes the participants want to meet again. Thereafter, the processing advances to step S114.

In step S114, an animation of the avatar of the user walking back from the house of the communication partner is displayed. The display control unit 33 generates an animation of the avatar of the user walking back along a road from the house of the communication partner, and displays this animation on the external display 3. This animation is displayed for a prescribed period of time (for example, 10 seconds).

FIG. 8 is a diagram showing a post-termination presentation screen image of the video chat application according to the present embodiment. Information relating to the communication partner is displayed on either side of the road in the animation which is displayed here. The display control unit 33 causes a portion of the image captured in the video chat that has just terminated immediately beforehand, and text obtained by voice recognition of a portion of the conversation exchanged in this immediately previous video chat, and the like, to be displayed on the external display 3 so as to be arranged along both sides of the road. By adopting a composition of this kind, it is possible to remind the user of the contents of the video chat. Furthermore, by looking back on the contents of the immediately previous video chat, the user can be made to feel like meeting up again. Incidentally, a portion of the conversation exchanged in the video chat may also be output as a voice directly from the external speaker 4 or the built-in speaker 30 of the second information processing apparatus 2. Thereafter, the processing shown in this flowchart terminates.

In step S121 to step S123, creation and transmission of a video letter are carried out. Upon receiving an operation instructing the start of recording of a video letter by the user (step S121), the information processing system 100 starts recording of images input from the camera 29 and acquired by the user image acquisition unit 31 (step S122). The image recording is terminated when an operation instructing termination of recording by the user is received, or when a prescribed recording limit time is reached. When image recording is terminated, the information processing system 100 generates a video letter including a moving image file of the recorded moving image, and transmits the video letter to the server, setting a communication partner as a destination (step S123). By carrying out processing of this kind, it is possible to send a message to the communication partner by a video letter, even when a video chat cannot be performed because the communication partner is absent, or for other reasons. The communication partner is able to view the video letter at a later time, at his or her convenience, and therefore it is possible to send a communication using a moving image which is not limited to a particular time. Thereafter, the processing shown in this flowchart terminates.

The server which has received the video letter sends a notification to the information processing system 100 of the communication partner indicating that there is a video letter. The information processing system 100 of the communication partner which has received this notification reproduces the video letter by a method such as downloading and reproducing the video letter from the server or streaming the video letter from the server. However, if the connection destination information of the communication partner is recognized, then the video letter may be transmitted to the information processing system 100 of the communication partner without passing via the server.

It is also possible to set a date and time at which the communication partner is permitted to view the video letter. The permitted viewing date and time thus set may be included in the metadata of the moving image file, or may be reported to the server, whereby the reproduction function of the information processing system 100 of the communication partner is controlled. When a permitted viewing date and time is set for the video letter, then after receiving the video letter, the communication partner is not able to view the video letter until the permitted viewing date and time is reached. Therefore, it is possible to save a plurality of video letters which have a permitted viewing date and time set to a certain same day, in a reception list, before a day of celebration, for example, and to thus create a sense of expectation in the user who is not able to see the contents of the letters until the permitted viewing date.

FIG. 9 is a flowchart showing a flow of recipient-side video chat processing relating to the present embodiment. The recipient-side video chat processing shown in this flowchart is executed whenever the video chat start request transmitted in step S108 of the caller-side video chat processing shown in FIG. 3A and FIG. 3B is received by the information processing system 100 of the recipient-side user. In this flowchart, the recipient-side user is described as the "user" and the caller-side user is described as the "communication partner".

In step S201 and step S202, an incoming call for a video chat is reported and a start-up operation of the video chat application is received. When a video chat start request transmitted by the caller-side information processing system 100 is received by the recipient-side information processing system 100, then the recipient-side information processing system 100 reports the incoming call to the user by, for instance, causing an LED (not illustrated) provided on the first information processing apparatus 1 or the second information processing apparatus 2 on the recipient side to flash on and off, or outputting a message to the external display 3, the built-in display 26, the external speaker 4 or the built-in speaker 30 (step S201). The information processing system 100 then starts up the video chat application by a response operation performed by the user who has received notification of an incoming call, or by an automatic response function (step S202). If the video chat application has already been started up, then the processing shown in step S202 is omitted. Thereafter, the processing advances to step S203.

In step S203, a moving image of the communication partner is displayed. The display control unit 33 causes the received moving image to be displayed on the external display 3 or the built-in display 26, when the caller-side information processing system 100 starts transmission of a moving image without waiting for a response from the recipient-side information processing system 100. By displaying a moving image of the caller side on the recipient side, before the recipient side responds, it is possible to give the recipient-side user an impression exactly like that of receiving a visit by the communication partner at the door of his or her home and checking the identity of the visitor through a door peep-hole, or the like. It is also possible to display the avatar of the communication partner rather than a moving image of the communication partner, and it is also possible to omit the processing shown in step S203. Thereafter, the processing advances to step S204.

In step S204 and step S205, a video chat response operation is received and a video chat is started. If there is an incoming call from the caller-side information processing system 100, then a button for responding to the incoming video chat is displayed on the built-in display 26. The user is able to accept a video chat by performing an operation of selecting the respond button via the touch panel 27 which is provided on the built-in display 26 (step S204). When a response indicating the acceptance of a video chat has been transmitted from the user's information processing system 100, the display control unit 33 and the communication control unit 35 start a video chat by starting the transmission, to the information processing system 100 of the communication partner, of the moving image and sound signal input via the camera 29 and the microphone 28 of the user's information processing system 100, and the reception of the moving image and sound signal from the information processing system 100 of the communication partner. Thereafter, the processing advances to step S206.

The processing in step S206 to step S208 is substantially the same as the processing in step S111 to step S113 which were described with reference to FIG. 3A and FIG. 3B and therefore further explanation thereof is omitted here. Thereafter, the processing advances to step S209.

In step S209, an animation of seeing off the avatar of the communication partner is displayed. The display control unit 33 generates an animation of the avatar of the user seeing off the avatar of the communication partner and causes this to be displayed on the external display 3. This animation is displayed for a prescribed period of time (for example, 10 seconds).

In the animation displayed here, information relating to the communication partner is displayed. The display control unit 33 causes a portion of the image captured in the video chat that has just terminated immediately beforehand, and text obtained by voice recognition of a portion of the conversation exchanged in this immediately previous video chat, and the like, to be displayed on the external display 3. By adopting a composition of this kind, it is possible to remind the user of the contents of the video chat, and it is also possible to make the user feel like making another video chat. Incidentally, a portion of the conversation exchanged in the video chat may also be output as a voice directly from the external speaker 4 or the built-in speaker 30 of the second information processing apparatus 2. Thereafter, the processing shown in this flowchart terminates.

<Variations of Display Mode>

According to the information processing system 100 relating to the present embodiment, the user is able to perform a video chat by using two displays, namely, the external display 3 which is connected to the first information processing apparatus 1 and the built-in display 26 of the second information processing apparatus 2. Consequently, the information processing system 100 relating to the present embodiment can assign the images used in a video chat to the two displays in a variety of patterns, and the displays on which the images used in video chat are displayed can be switched freely during a video chat. Below, variations of the assignment of images displayed on the external display 3 and the built-in display 26 during a video chat are described.

Figure 10A:
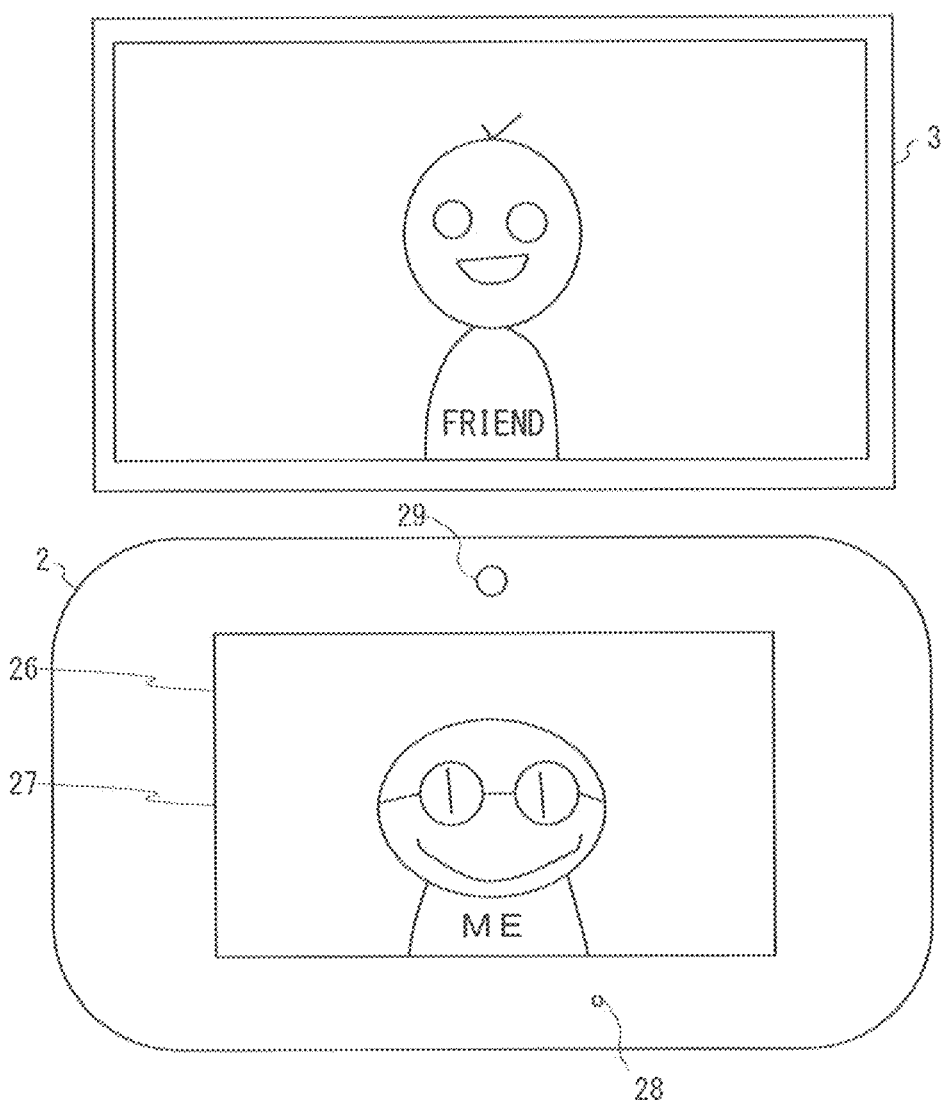
FIG. 10A shows a non-limiting example of a display assignment in which a communication partner image is displayed on an external display and a user image is displayed on a built-in display.

FIG. 10A is a diagram showing an example of a display assignment in which an image of the communication partner is displayed on the external display 3 and an image of the user (hereinafter, simply called "user image") is displayed on the built-in display 26 in the present embodiment. In the example shown in FIG. 10A, the communication partner image is displayed mainly on the external display 3 which is connected to the first information processing apparatus 1. However, it is also possible to display the user image on the external display 3, at a smaller size than the communication partner image. Furthermore, the user image is displayed on the built-in display 26 of the second information processing apparatus 2. The user image may also be displayed on the built-in display 26, at a smaller size than the communication partner image (see FIG. 10E).

Figure 10B:
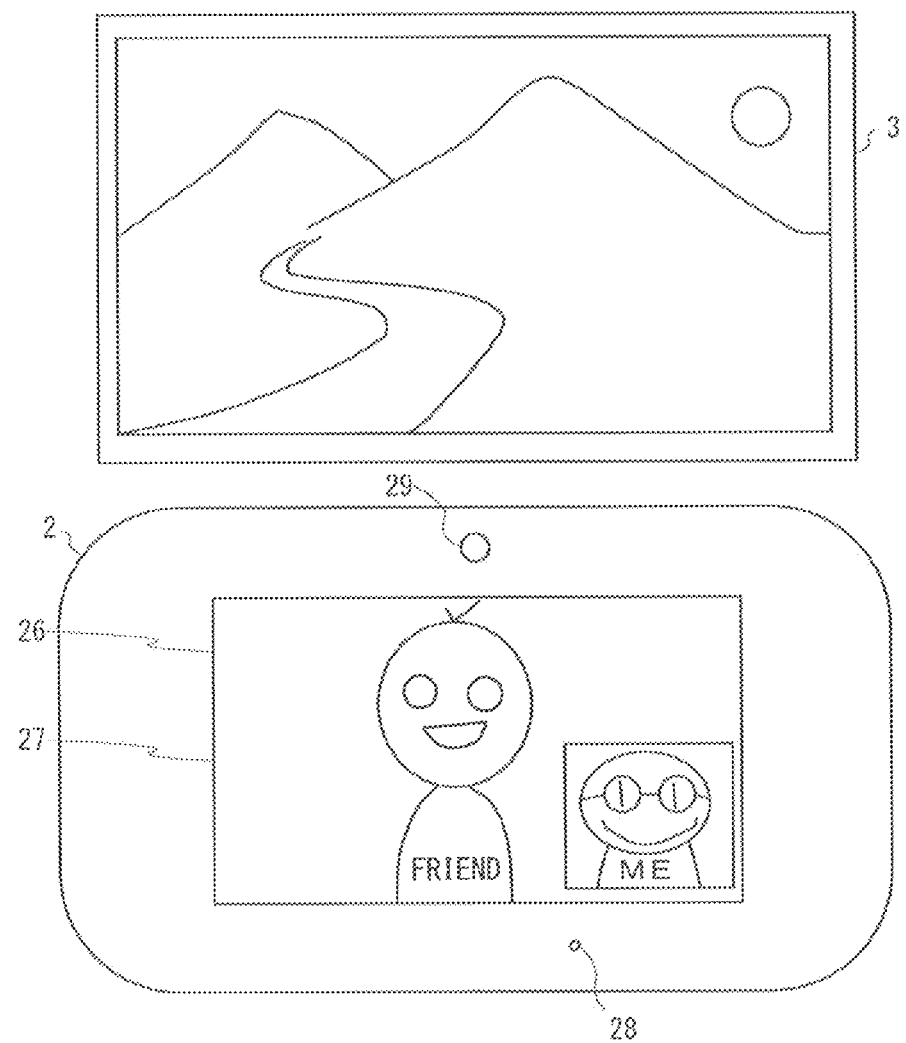
FIG. 10B shows a non-limiting example of a display assignment in which neither the communication partner image nor the user image are displayed on an external display, and the communication partner image and the user image are displayed on a built-in display.
Figure 10C:
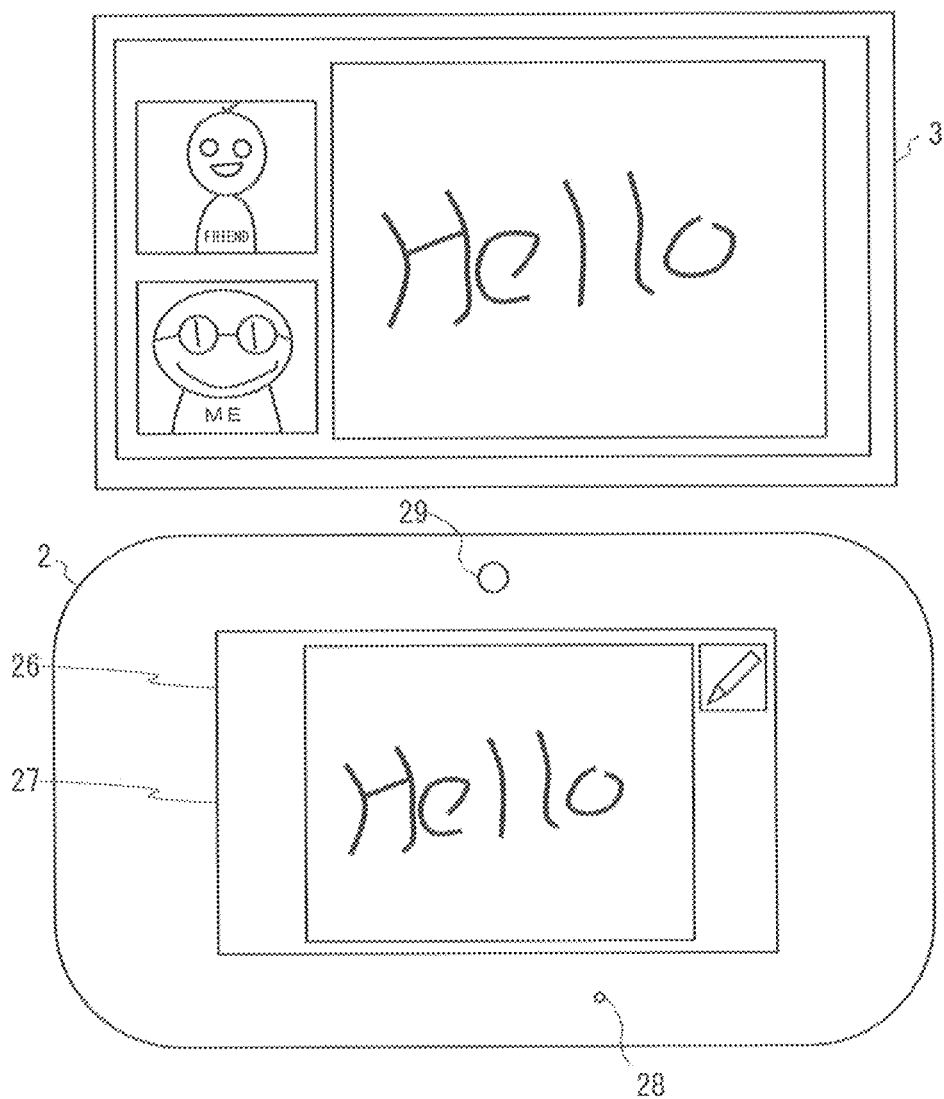
FIG. 10C shows a non-limiting example of a display assignment in a case where a "drawing chat" is carried out while performing a video chat.
Figure 10D:
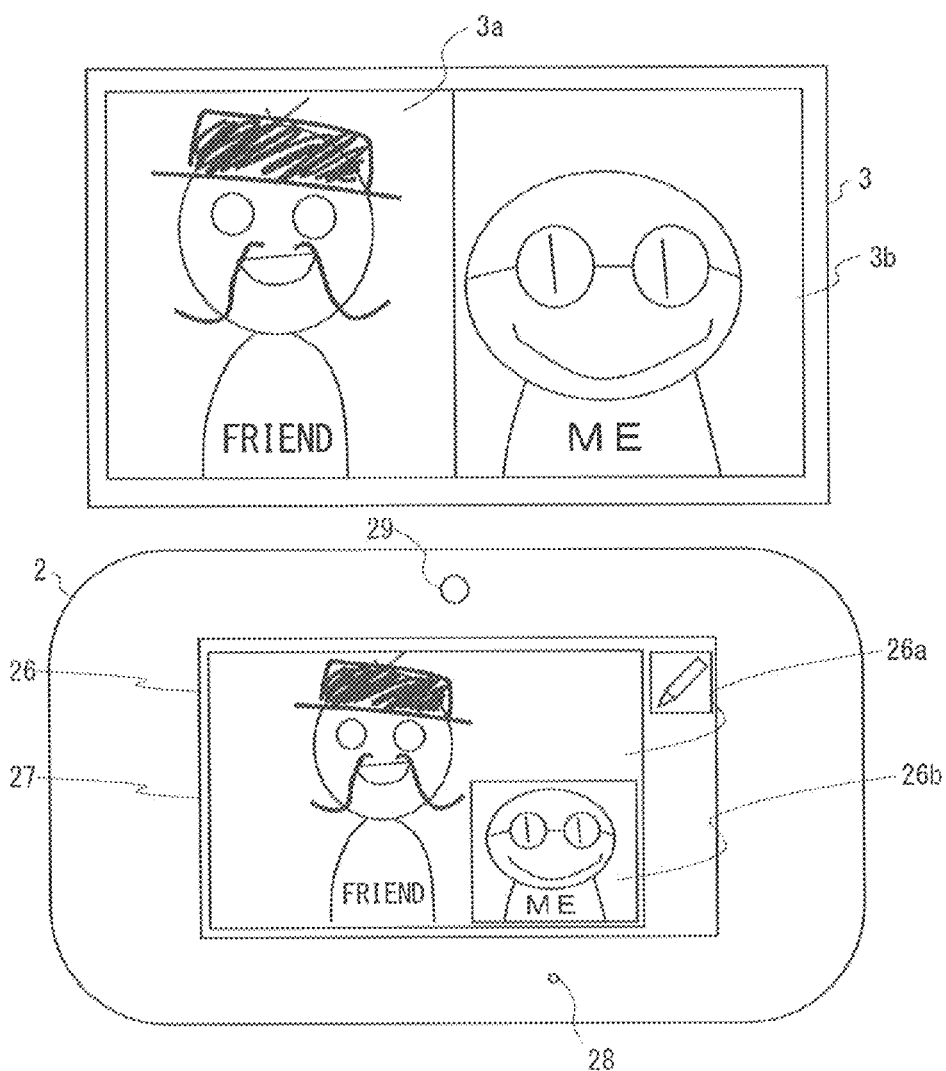
FIG. 10D shows a non-limiting example of a display assignment in a case where a "drawing chat" is carried out on an image of a video chat.
Figure 10E:
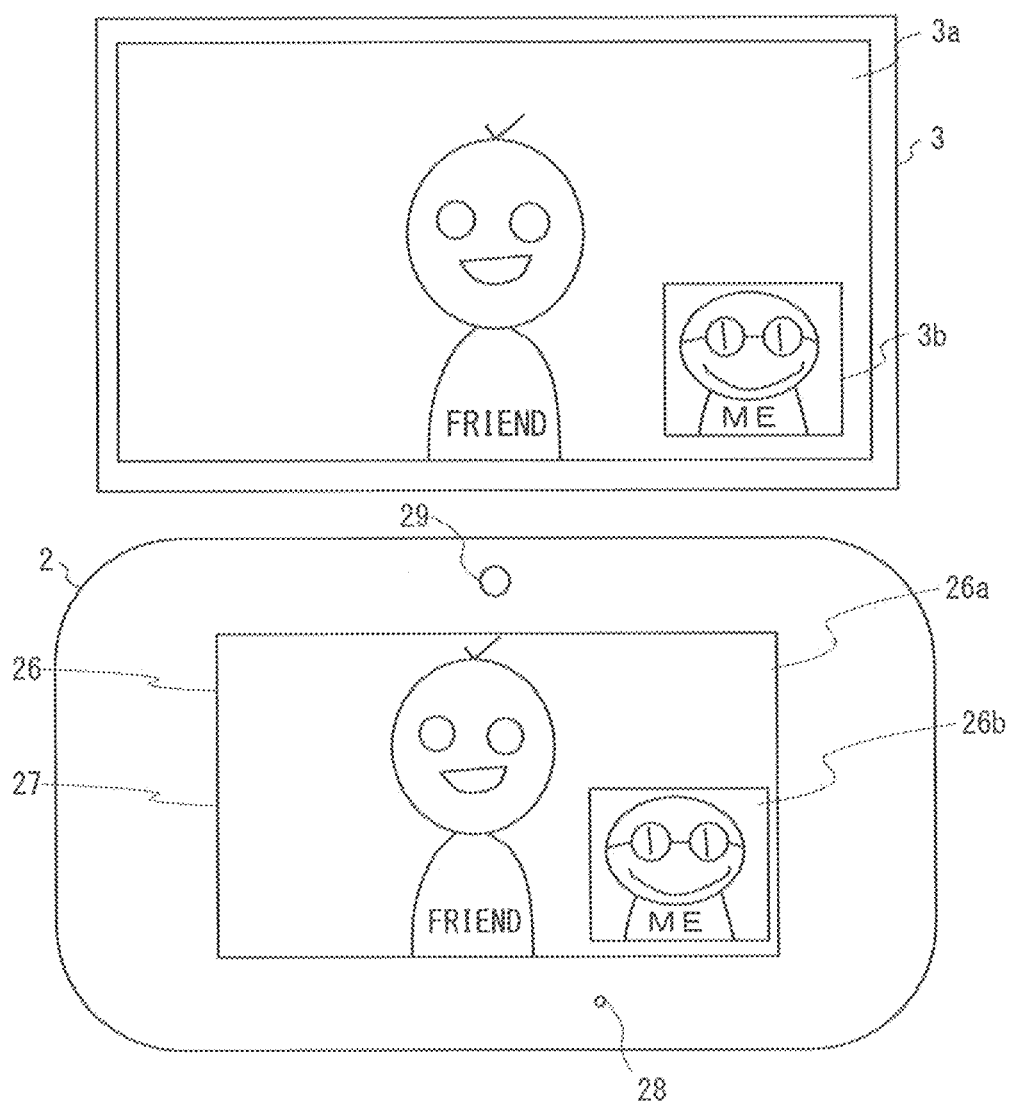
FIG. 10E shows a non-limiting example of display assignment in which a communication partner image and a user image are displayed respectively on an external display and a built-in display.

FIG. 10E is an image showing an example of a display assignment in which a communication partner image and a user image are displayed respectively on the external display 3 and the built-in display 26, in the present embodiment. In the example shown in FIG. 10E, first display regions 3*a*, 26*a* and second display regions 3*b*, 26*b* are set respectively on the external display 3 and the built-in display 26. In the present embodiment, the second display regions 3*b*, 26*b* are smaller than the first display regions 3*a*, 26*a* (in other words, the first display regions 3*a*, 26*a* are larger than the second display regions 3*b*, 26*b*). In an initial state, a communication partner image is displayed in the first display region 3*a* of the external display 3 and a user image is displayed in the second display region 3*b* of the external display 3. Furthermore, a communication partner image is displayed in the first display region 26*a* of the external display 26 and a user image is displayed in the second display region 26*b* of the external display 26.

Here, it is also possible to adopt a composition in which the display configurations of both the external display 3 and the built-in display 26 can be switched simultaneously, by performing a touch operation of the second display region 26*b* of the built-in display 26, in other words, by touching the video image which is displayed at a smaller size. More specifically, if a touch operation on the second display region 26*b* of the built-in display 26 is received by an operation receiving unit (not illustrated) of the information processing system 100 in the display state shown in FIG. 10E, then the switching unit 34 may switch the display contents of the first display regions 3*a*, 26*a* and the second display regions 3*b*, 26*b* on both the external display 3 and the built-in display 26. As a result of the switching operation of this kind performed by the switching unit 34, the size relationship of the displays of the user video image and the communication partner video image is reversed and hence the communication partner image is displayed at a smaller size than the user image. When a touch operation of the second display region 26*b* of the built-in display 26 is performed again, the switching unit 34 switches the display contents of the first display regions 3*a*, 26*a* and the second display regions 3*b*, 26*b*, on both the external display 3 and the built-in display 26, and consequently the display state returns to the relationship shown in FIG. 10E. Furthermore, by this operation, it is also possible to switch an editable image in a "drawing chat", which is described hereinafter.

By assigning the communication partner image and the user image to the displays as shown in the examples depicted in FIG. 10A or FIG. 10E, the user him or herself is able to perform a video chat via the built-in display 26 while moving about holding the portable second information processing apparatus 2, while other people present in the area of the user (family members, etc.) are able to view the contents of the video chat of the communication partner (and the user) via the external display 3.

FIG. 10B is an image showing an example of a display assignment in which neither the communication partner image nor the user image are displayed on the external display 3, and the communication partner image and the user image are displayed on the built-in display 26, in the present embodiment. In the example shown in FIG. 10B, neither the communication partner image nor the user image are displayed on the external display 3 which is connected to the first information processing apparatus 1, but rather another image is displayed. Here, the other image which is displayed on the external display 3 may be an image which is neither the user image nor the communication partner image, for example, it may be a wallpaper image of some kind which is displayed instead of the video chat image, or it may be an image of another application (game, or the like) which is executed by the information processing system 100. A communication partner image is displayed on the built-in display 26 and the user image is displayed at a smaller size than the communication partner image. In the example shown in FIG. 10B, it is also possible to adopt a composition in which the display configurations of both the external display 3 and the built-in display 26 can be switched simultaneously, by performing a touch operation of the video image which is displayed at a smaller size on the built-in display 26.

By assigning the communication partner image and the user image to the displays as in the example shown in FIG. 10B, it is possible to perform a video chat without the user who is performing a video chat occupying the external display 3, which is a television receiver, or the like. Furthermore, this composition is also useful in cases where the user wishes to hide the moving images of the video chat so that they cannot be seen by other people in the area of the user. The display assignments indicated in the present embodiment can be switched freely during a video chat, so that, for instance, the display assignment in FIG. 10A is adopted when a user is enjoying a video chat together with other people located in the area of the user and the display assignment is switched (changed) to that shown in FIG. 10B when people located in the area of the user wish to use the external display 3 to enjoy other content, but the user wishes to continue a video chat, or when the user wishes to enjoy a video chat alone.

FIG. 10C is a diagram showing an example of display assignment when carrying out a "drawing chat" while performing a video chat, in the present embodiment. Here, a "drawing chat" means communication between participants in which editable images which can be edited by the participants of the video chat are prepared and hand-drawn lines and figures can be added to and deleted from the editable image while performing a video chat. The editable image is edited in accordance with user operations performed by means of a pointing device, such as the touch panel 27, and received by means of an operation receiving unit (not illustrated in the drawings). For example, a path of travel corresponding to change in a position designated by a pointing device is identified on the editable image, and a line or figure, or the like, is added to the editable image along this path of travel. The editable image may be editable by only one of the participants, or may be editable simultaneously by a plurality of participants. In the example shown in FIG. 10C, an editable image for "drawing chat" is displayed in addition to the communication partner image and the user image, on the external display 3 which is connected to the first information processing apparatus 1. The display contents of the editable image are updated so as to reflect, in real time, the editing contents performed by a user having editing rights. The contents of the editable image are mainly displayed on the built-in display 26. The editing of the editable image is carried out by performing inputs to the touch panel 27, or the like, which is provided on the built-in display 26.

FIG. 10D is a diagram showing an example of display assignment when carrying out a "drawing chat" on the images of a video chat, in the present embodiment. In the example shown in FIG. 10D, a transmissive editable image which can be edited by a participant of the video chat is displayed in superimposed fashion on the communication partner image and the user image of the video chat. Therefore, participants of the video chat can carry out editing of the editable image as if writing over the communication partner image and the user image, and can thus communicate with each other. Similarly to the example that was described with reference to FIG. 10C, the editable image may be editable by only one of the participants, or may be editable simultaneously by a plurality of participants. In the example shown in FIG. 10D, a communication partner image and a user image are displayed in the first display region 3a and the second display region 3b of the external display 3 connected to the first information processing apparatus 1, and an editable image for "drawing chat" is displayed in superimposed fashion on each of these images. The display contents of the editable image are updated so as to reflect, in real time, the editing contents performed by a user having editing rights. A communication partner image and a user image are also displayed in the first display region 26a and the second display region 26b of the built-in display 26, and an editable image for "drawing chat" is displayed in superimposed fashion on each of these images. It is also possible for the editable image to be displayed in superimposed fashion in only one of the display regions (for example, the first display regions 3a, 26a), and for the editable image to not be displayed in the other display region (for example, the second display regions 3b, 26b). It is possible to carry out art drawing by using a touch panel 27 or a pointing device which is provided on the built-in display 26, and the input results of this art drawing are reflected on the built-in display 26 and the external display 3.

In the example shown in FIG. 10D, the first display regions 3a, 26a and the second display regions 3b, 26b are set respectively on the external display 3 and the built-in display 26. In the example shown in FIG. 10D, the second display region 26b is smaller than the first display region 26a on the built-in display 26 only (in other words, the first display region 26a is larger than the second display region 26b). However, the second display region 3b can also be made smaller than the first display region 3a on the external display 3 also. In an initial state, a communication partner image is displayed in the first display regions 3a, 26a and a user image is displayed in the second display regions 3b, 26b.

Here, similarly to the example described with reference to FIG. 10E, it is also possible to adopt a composition in which the display configurations of both the external display 3 and the built-in display 26 can be switched simultaneously, by performing a touch operation of the second display region 26b of the built-in display 26, in other words, by touching the video image which is displayed at a smaller size. More specifically, if a touch operation on the second display region 26b of the built-in display 26 is received by the operation receiving unit of the information processing system 100 in the display state shown in FIG. 10D, then the switching unit 34 may switch the display regions where the communication partner image and the user image are displayed, between the first display regions 3a, 26a and the second display regions 3b, 26b, on both the external display 3 and the built-in display 26. Here, if a further touch operation is performed on the second display region 26b, then the switching unit 34 switches the display regions where the communication partner image and the user image are displayed, on both the external display 3 and the built-in display 26, and consequently, the display state returns to the relationship shown in FIG. 10D.

However, the display region where the editable image is displayed is not changed by the touch operation described above. In other words, the editable image that was shown in the first display regions 3a, 26a continues to be displayed in the first display regions 3a, 26a, even if the display regions where the communication partner image and the user image are displayed is switched by a touch operation. Similarly, the editable image that was shown in the second display regions 3b, 26b continues to be displayed in the second display regions 3b, 26b, even if the display regions where the communication partner image and the user image are displayed is switched. By adopting this composition, it is possible to switch the object on which the editable image edited by the user is superimposed, between the communication partner image and the user image.

An example was described above in which the editable image is displayed in superimposed fashion on each of the first display regions 3a, 26a and the second display regions 3b, 26b, but the editable image may also be displayed in superimposed fashion on either one of the display regions only (for example, the first display regions 3a, 26a), and the editable image may not be displayed on the other display regions (for example, the second display regions 3b, 26b). In this case also, the editable image which is displayed on the first display regions 3a, 26a is still displayed on the first display regions 3a, 26a, even when the display regions where the communication partner image and the user image are displayed is switched by a touch operation, and the object on which the editable image is superimposed can be switched between the communication partner image and the user image.

Furthermore, a display assignment that is different to the example shown in FIG. 10D is also adopted for the display assignment in a case where a "drawing chat" is performed on a video chat image. In the example shown in FIG. 10D, the first display regions 3a and 26a and the second display regions 3b, 26b which are provided respectively on the external display 3 and the built-in display 26 are used as a first display section and a second display section for displaying the communication partner image and the user image. It is also possible to adopt a display assignment in which the external display 3 is taken as the first display section and the built-in display 26 is taken as the second display section, instead of the display assignment of this kind. In this case, the switching unit switches the display contents between the external display 3, which is the first display section, and the built-in display 26, which is the second display section.

In the description described above, a method is explained in which a transmissive editable image is displayed in superimposed fashion on the user image/communication partner image, but instead of a method of this kind, it is also possible to adopt a method in which a stationary image of the user image/communication partner image is captured and the captured image is displayed as an editable image.

Furthermore, it is possible to change whether or not the communication partner has or does not have viewing rights in relation to the editable image, regardless of whether or not the image is transmissive, and it is also possible for a user having editing rights to edit the editable image, regardless of whether or not the communication partner has viewing rights. After editing the editable image in a state where no viewing rights have been granted to the communication partner (undisclosed state), it is possible to surprise the communication partner watching the editable image by granting viewing rights to the communication partner (disclosing the image). Of course, after granting viewing rights, it is also possible to grant editing rights to the communication partner also, so that the image can be edited simultaneously by a plurality of users. Furthermore, it is also possible to grant viewing rights to all of the video chat participants (in other words, a state where anyone can view the image) and to grant editing rights to each user.

The editing rights may also be set for each portion edited by each user, in the editable image. More specifically, in the editable image, each of the users can delete or change the portion that he or she has edited himself or herself (namely, the lines that he or she has drawn, the line colors, and so on). More specifically, the image editing unit (not illustrated) of the information processing system 100 deletes or changes the portions of the editable image that have been edited by the user looking at the built-in display 26, in accordance with an operation performed by the user looking at the built-in display 26, and deletes or changes the portions of the editable image that have been edited by the communication partner in accordance with an operation performed by the communication partner.

In other words, in a "drawing chat" according to the present embodiment, two types of rights, namely, viewing rights and editing rights are set in respect of an editable image. However, in order to confirm rights of this kind, it is complicated for a user to refer to setting information and the like relating to the editable image during a video chat, and the user cannot easily identify these rights. Therefore, a composition can be adopted in which the viewing rights and the editing rights can be ascertained from the display state on the display and the display state of the avatars.

For example, it may be made possible to judge the presence or absence of viewing rights for the communication partner, based on the absence of presence of a display on the external display 3. The external display 3 is a display which can be viewed readily by persons other than the user. Therefore, if there is a display on the external display 3, the user can ascertain, with his/her intuition, that the image is being viewed by the communication partner, and if there is no display on the external display 3 and there is a display on the built-in display 26 only, then the user can ascertain, with his/her intuition, that the image is not being viewed by the communication partner. Furthermore, the user is also able to manage the viewing rights of the editable image simply by an intuitive operation such as switching the display of the editable image on the external display 3 on and off, without being aware of the viewing rights settings.

Moreover, for example, it is also possible to judge which of the users has editing rights, on the basis of the avatar which is displayed in superimposed fashion in front of the editable image. In this case, the avatar of a user having editing rights is displayed in superimposed fashion on the editable image. Furthermore, the avatar displayed in this case may be displayed in a state of holding painting tools, so that it is possible to ascertain that the user of that avatar has editing rights, with the user's intuition. Moreover, the user is also able to manage the editing rights of the editable image simply by an intuitive operation such as switching the display of the avatar on the editable image on and off, without being aware of the editing rights settings.

Moreover, the information processing system 100 relating to the present embodiment may include a function for changing the size of the image which is displayed in larger size on the built-in display 26. For example, it is possible to switch between a mode in which a full camera video image having a vertical to horizontal aspect ratio of 3:4 is displayed (with blank margins being shown to the left and right of the camera image) and a mode in which the top and bottom ends of the camera video image are cut off and the image is displayed in the whole of the controller screen having a vertical to horizontal aspect ratio of 9:16.

Moreover, the information processing system 100 relating to the present embodiment may include a function for changing the ratio of the display region of the external display 3 occupied by the image which is displayed in larger size on the external display 3. For example, the information processing system 100 may be provided with a function for switching, in multiple stages, the ratio of the display region of the external display 3 that is occupied by the larger image on the external display 3. By adopting a composition of this kind, it is possible to improve the users' experience, by setting an image size which avoids conspicuous roughness of the image when using an external display 3 which has a display region of a large size, and by displaying an image over the whole of the screen, as far as possible, when using an external display 3 which has a display region of a small size.

<Tilt Correction>

Figure 11:
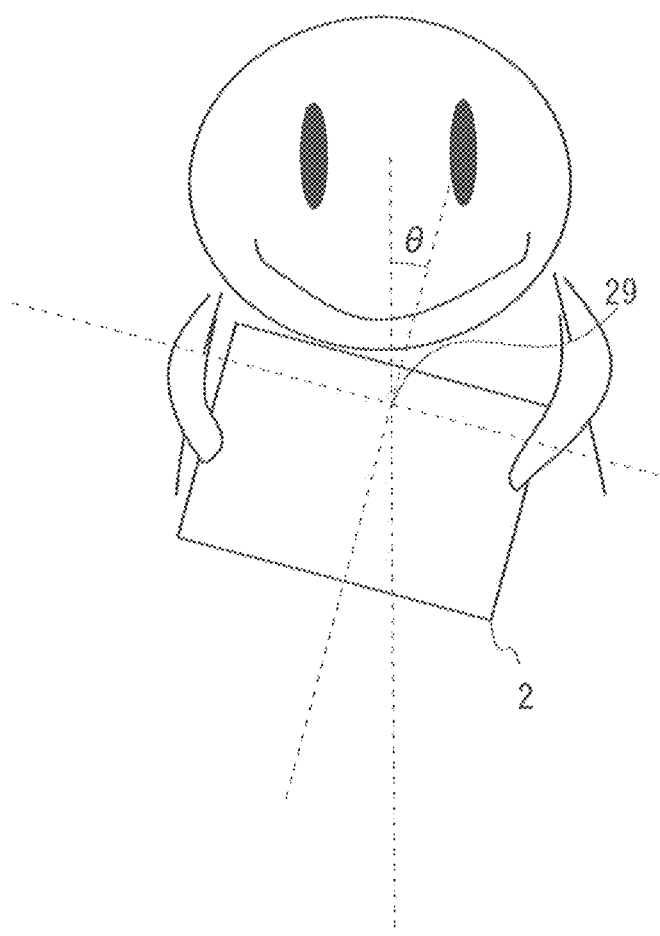
FIG. 11 shows a non-limiting example of a schematic view of tilt correction of an image which is carried out using an output from a gyro sensor.

FIG. 11 is a diagram showing an approximate view of tilt correction of the image which is carried out by using an output from the gyro processor 25 in the present embodiment. The second information processing apparatus 2 relating to the present embodiment captures images of the user by using the camera 29 and sends the images to the information processing apparatus of the communication partner, but when the second information processing apparatus 2 is used while being held by the user during a video chat, then the images captured by the camera 29 may be tilted. Therefore, the information processing system 100 relating to the present embodiment detects tilting of the camera 29 by referring to information acquired from the gyro sensor 25 which is provided in the second information processing apparatus 2, and applies a tilt correction to the images captured by the camera 29. In the example shown in FIG. 11, the display control unit 33 carries out tilt correction for rotating the captured image through $-\theta$ degrees, when a tilt angle $\theta$ of the camera 29 is obtained on the basis of the information acquired from the gyro sensor 25. The display control unit 33 then outputs the corrected image to the external display 3 or the built-in display 26, and the communication control unit 35 sends this corrected image to the information processing system 100 of the communication partner. However, tilt correction may also be carried out in the information processing system 100 of the communication partner. In this case, the communications control unit 35 sends images without tilt correction, and information about the tilt angle $\theta$, to the information processing system 100 of the communication partner.

<Image Capture>

Figure 12:
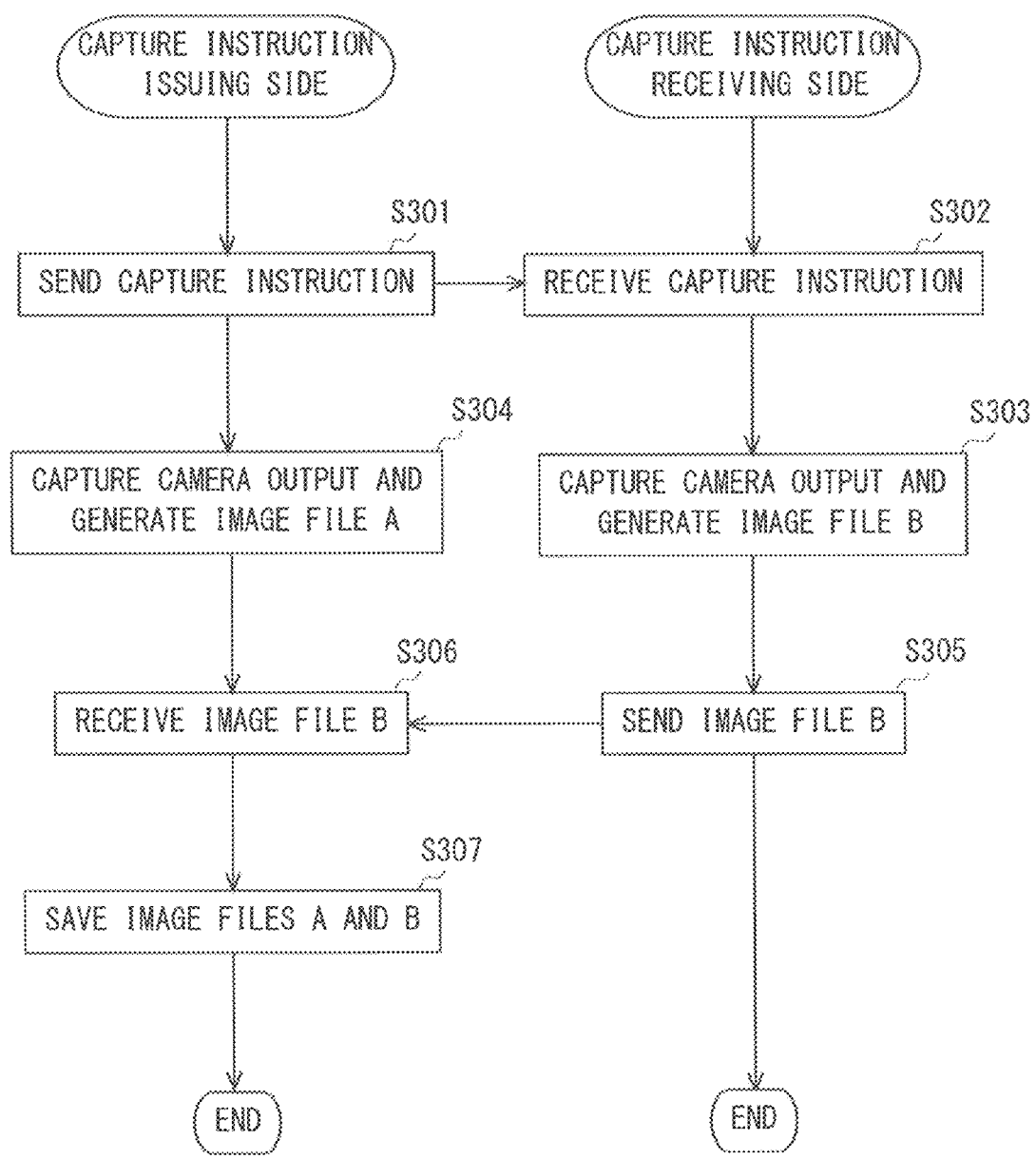
FIG. 12 shows a non-limiting example of a sequence diagram showing a flow of image capture processing during a video chat.

FIG. 12 is a sequence diagram showing a flow of image capture processing during a video chat, in the present embodiment. The capture processing shown in this sequence diagram is carried out when a user operation instructing image capture is received, or when image capture is instructed automatically by the information processing system 100. For example, the information processing system 100 instructs image capture when the image analysis engine has detected a smiling face in the image obtained by the camera 29 or when the amount of change in the volume of the sound signal obtained by the microphone 28 has exceeded a prescribed value. The capture processing shown in this sequence diagram can be carried out by either the caller-side user or the recipient-side user.

In step S301 to step S304, an image capture instruction is sent and received, and the capturing of images is carried out. The information processing system 100 on the side issuing the capture instruction sends a capture instruction to the information processing system 100 of the communication partner (the side receiving the capture instruction) (step S301). Upon receiving an image capture instruction (step S302), the information processing system 100 on the side receiving the capture instruction generates an image file B by capturing the image before carrying out processing, such as compression, for transmission over the network, from the output of the camera 29 in the information processing system 100 on the side receiving the capture instruction (step S303). Furthermore, the information processing system 100 of the user on the side issuing the capture instruction captures an image before carrying out processing, such as compression for transmission over the network, from the output of the camera 29 in the information processing system 100 of the user on the side issuing the capture instruction, either simultaneously with or at a timing near to the capture (step S303) on the side issuing the capture instruction, and thereby generates an image file A (step S304). Thereafter, the processing advances to step S305.

In step S305 to step S307, the captured image file B is transmitted and received, and the captured image files A and B are saved. The information processing system 100 on the capture instruction receiving side transmits the image file B generated in step S303, to the information processing system 100 of the user on the capture instruction issuing side (step S305). Upon receiving an image file B (step S306), the information processing system 100 of the user on the capture instruction issuing side associates the received image file B (the image file B generated at step S303) with the image file A generated at step S304, and saves the file in an auxiliary storage apparatus 14 of the first information processing apparatus 1. Thereafter, the processing shown in this sequence diagram terminates.

According to the processing shown in the sequence diagram, when carrying out image capture, capture is performed by issuing a capture instruction to the information processing apparatus of the communication partner and the captured images are received, rather than performing capture in respect of images received by means of the network. Therefore, it is possible to acquire captured images that are of good image quality and free from the effects of compression for transmission over the network, and of packet loss which occurs when carrying out communications by a real-time protocol over the network and data loss caused by packet delays. Furthermore, by carrying out image capture in the information processing system 100 on the side issuing the capture instruction, in substantially simultaneous fashion with the side receiving the capture instruction, it is possible to record the aspect of the video chat with good quality, by synthesizing the respectively captured images. The captured images may be still images or may be moving image files of a limited time duration (for example, several seconds). Furthermore, the captured images may be displayed as information relating to the communication partner as described above, in step S104, step S114, and step S209.

<Video Chat Hold Function>

Furthermore, the information processing system 100 relating to the present embodiment may include a function for holding a video chat, as with a telephone call holding function. This function can be used when a user does not want video images and sound information to be transmitted to the other party when, for instance, the user moves away from the location of the video chat or has received an incoming call on a fixed line. In the hold function relating to the present embodiment, upon receiving a hold operation, the information processing system 100 may transmit absolutely no user images or sound signals to the communication partner, or may transmit only information which gives a sense of the user's presence (for example, a soft-focus video image). Furthermore, by making it possible to edit the editable image from both sides, while a call is on hold, a user can, for instance, explain the circumstances by handwriting, in a situation where sound signals and video images cannot be conveyed to the other partner. By adopting a composition of this kind, it is possible to avoid giving the communication partner cause for concern while a call is on hold. It is also possible for a user to leave a message for the other partner on the editable image, when the user cuts off the video chat himself or herself while the call is on hold.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A computer-readable non-transitory medium on which is recorded an information processing program for causing a computer connected to a first display apparatus and a second display apparatus to function as:
   a first image acquisition unit which acquires a first image captured by using a camera capable of capturing an image of a first user who is viewing the first display apparatus and the second display apparatus, wherein the first display apparatus is included in a portable information processing apparatus, the portable information processing apparatus including 1) the camera capable of capturing the image of the first user, and 2) a wireless transceiver;
   a second image acquisition unit which acquires, from another information processing apparatus which is connected via a network, a second image captured by using another camera capable of capturing an image of a second user of the other information processing apparatus; and
   a display control unit which causes at least one of the first image and the second image to be displayed on the first display apparatus, and which causes at least one of the first image and the second image to be displayed on the second display apparatus or causes an image that is neither the first image nor the second image to be displayed on the second display apparatus,
   wherein the information processing program further causes the computer to function as a switching unit which switches a display state of the first image or the second image, between the first display apparatus and the second display apparatus,
   wherein the portable information processing apparatus is configured to wirelessly communicate, via the wireless transceiver of the portable information processing apparatus, with another wireless transceiver that included with another information processing apparatus, the another information processing apparatus configured to output images or video to the second display apparatus in accordance with the display control unit.

2. The computer-readable non-transitory medium on which an information processing program is recorded according to claim 1, wherein the display control unit causes the first image to be displayed on the first display apparatus and causes the second image to be displayed on the second display apparatus.

3. The computer-readable non-transitory medium on which an information processing program is recorded according to claim 2, wherein the display control unit further causes the first image to be displayed on the second display apparatus.

4. The computer-readable non-transitory medium on which an information processing program is recorded according to claim 1, wherein the display control unit causes the first image and the second image to be displayed on the first display apparatus and causes an image that is neither the first image nor the second image to be displayed on the second display apparatus.

5. The computer-readable non-transitory medium on which an information processing program is recorded according to claim 1, wherein the display state which is switched by the switching unit includes: a first display state in which the first image is displayed on the first display apparatus and the second image is displayed on the second display apparatus, and a second display state in which the first image and the second image are displayed on the first display apparatus and an image that is neither the first image nor the second image is displayed on the second display apparatus.

6. The computer-readable non-transitory medium on which an information processing program is recorded according to claim 1,
wherein the first display apparatus and the second display apparatus each have a first display region and a second display region, and
the display control unit causes one of the first image and the second image to be displayed on the first display region of the first display apparatus and the first display region of the second display apparatus, and causes the other of the first image and the second image to be displayed on the second display region of the first display apparatus and the second display region of the second display apparatus.

7. The computer-readable non-transitory medium on which an information processing program is recorded according to claim 6, wherein the information processing program further causes the computer to function as a switching unit which switches the first image and the second image between the first display region and the second display region.

8. The computer-readable non-transitory medium on which an information processing program is recorded according to claim 7,
wherein the information processing program further causes the computer to function as an operation receiving unit which is provided in the first display apparatus and which receives an operation performed by the user, and
the switching unit switches the first image and the second image respectively in the first display apparatus and the second display apparatus, when an operation indicating the second display region of the first display apparatus is received by the operation receiving unit.

9. The computer-readable non-transitory medium on which an information processing program is recorded according to claim 6, wherein the display control unit controls display in such a manner that the first display region is larger than the second display region in the same display apparatus.

10. The computer-readable non-transitory medium on which an information processing program is recorded according to claim 1, wherein the first display apparatus is a display apparatus which can be used exclusively by the user, and the second display apparatus is a display apparatus that can also be viewed by viewers other than the user.

11. An information processing apparatus which is connected to a portable information processing apparatus that includes a first display apparatus, a camera, and a first wireless transceiver, the information processing apparatus comprising:
a second wireless transceiver configured to communicate with the first wireless transceiver of the portable information processing apparatus:
a first image acquisition unit which acquires a first image captured by using the camera capable of capturing an image of a first user who is viewing the first display apparatus and a second display apparatus;
a second image acquisition unit which acquires, from another information processing apparatus which is connected via a network, a second image captured by using another camera capable of capturing an image of a second user of the other information processing apparatus; and
a display control unit which causes, via wireless communication with the portable information processing apparatus, at least one of the first image and the second image to be displayed on the first display apparatus, and which causes, by outputting a signal to the second display apparatus, at least one of the first image and the second image to be displayed on the second display apparatus or causes an image that is neither the first image nor the second image to be displayed on the second display apparatus,
wherein the display control unit causes the first image to be displayed on the first display apparatus and concurrently causes the second image to be displayed on the second display apparatus.

12. The information processing apparatus of claim 11, further comprising a switching unit which, in response to a switching instruction, switches a display state of the first image or the second image, between the first display apparatus and the second display apparatus.

13. A system comprising:
a portable information processing apparatus that includes a first display apparatus, a camera, and a first wireless transceiver; and
a processing system that includes at least one hardware processor, a memory, and a second wireless transceiver configured to wirelessly communicate with the first wireless transceiver, the processing system coupled to a second display apparatus that is separate from the first display apparatus, the processing system configured to:
acquire a first image that has been captured by using the camera of the portable information processing apparatus, the first image of a first user who is in a viewing range of the first display apparatus and the second display apparatus;
acquire, from another computer system which is connected to the processing system via an electronic communications network, a second image captured by using another camera that is capable of capturing an image of a second user of the other information processing apparatus;
cause, via wireless communication between the first and second wireless transceivers, at least one of the first image and the second image to be displayed on the first display apparatus;
cause at least one of the first image and the second image to be displayed on the second display apparatus or causes another image that is different from the first image and the second image to be displayed on the second display apparatus; and
in response to a switch instruction, switch which one of the first and second display apparatuses that the first image or the second image is displayed on.

14. The system according to claim 13, wherein the first display apparatus is a display apparatus which can be used exclusively by the first user, and the second display apparatus is a display apparatus that is commonly viewable by viewers other than the first user.

15. The system of claim 13, wherein the another image is displayed on the second display apparatus concurrently with display of the at least one of the first image and the second image on the first display apparatus.

16. The system of claim 15, wherein both the first image and the second image are concurrently displayed on the first display apparatus concurrently with the another image on the second display apparatus.

17. An information processing method for use with a portable information processing apparatus that includes a first display apparatus, a camera, and a first wireless transceiver and another apparatus that includes a second wireless transceiver configured to wirelessly communicate with the first wireless transceiver, the method comprising:
   acquiring a first image captured by using the camera capable of capturing an image of a first user who is viewing the first display apparatus, the first and second display apparatuses being commonly viewable by the first user;
   acquiring, from another information processing apparatus which is connected via a network, a second image captured by using another camera capable of capturing an image of a second user of the other information processing apparatus;
   causing, via wireless communication between the first and second transceivers, at least one of the first image and the second image to be displayed on the first display apparatus that is part of the portable information processing apparatus; and
   causing, by outputting a signal to the second display apparatus, at least one of the first image and the second image to be displayed on the second display apparatus or causing an image that is neither the first image nor the second image to be displayed on the second display apparatus, wherein the first image is caused to be displayed on the first display apparatus and the second image is caused to be concurrently displayed, with display of the first image, on the second display apparatus.

18. A non-transitory computer-readable medium on which is recorded an information processing program for use with a computer connected to a first display apparatus and a second display apparatus that is separate from the first display apparatus, the computer coupled to a data communications network, the computer including a second wireless transceiver that is configured to wirelessly communicate with a first wireless transceiver that is part of a portable apparatus that also includes the first display apparatus, the information processing program comprising instructions configured to cause the computer to:
   acquire a first image captured by using a camera capable of capturing an image of a first user who is viewing the first display apparatus, where the first and second display apparatuses are concurrently viewable by the first user;
   acquire, from another information processing apparatus which is connected via the data communications network, a second image that has been captured by using another camera capable of capturing an image of a second user of the other information processing apparatus;
   transmit, via the data communications network, the first image to the another information processing apparatus for display on a third display apparatus that is different from the first and second display apparatuses;
   cause, via wireless communication between the first and second wireless transceivers, the first image to be displayed on the first display apparatus; and
   cause, by outputting a signal to the second display apparatus, the second image to be displayed on second display apparatus.

* * * * *